(12) United States Patent
Oakes et al.

(10) Patent No.: US 9,474,420 B2
(45) Date of Patent: Oct. 25, 2016

(54) SEALABLE SNACK CONTAINER

(75) Inventors: Shawn A. Oakes, Ripon, WI (US);
Dean P. Swoboda, DePere, WI (US)

(73) Assignee: DIXIE CONSUMER PRODUCTS LLC, Atlanta, GA (US)

( * ) Notice: Subject to any disclaimer, the term of this patent is extended or adjusted under 35 U.S.C. 154(b) by 1016 days.

(21) Appl. No.: 13/199,114

(22) Filed: Aug. 19, 2011

(65) Prior Publication Data
US 2012/0048874 A1 Mar. 1, 2012

Related U.S. Application Data

(60) Provisional application No. 61/378,229, filed on Aug. 30, 2010.

(51) Int. Cl.
*A47J 47/14* (2006.01)
*B65D 21/06* (2006.01)
(Continued)

(52) U.S. Cl.
CPC .............. *A47J 47/14* (2013.01); *B65D 21/064* (2013.01); *B65D 43/162* (2013.01); *B29C 51/10* (2013.01); *B29C 51/30* (2013.01); *B29C 2791/006* (2013.01); *B29L 2031/565* (2013.01); *B29L 2031/7162* (2013.01); *B29L 2031/7168* (2013.01); *B29L 2031/7282* (2013.01); *B65D 2543/00027* (2013.01);
(Continued)

(58) Field of Classification Search
CPC .......... B65D 2543/00555; B65D 2543/00842; B65D 2543/00907; B65D 21/064; B65D 43/162; B65D 2543/00101; B65D 2543/00537; B65D 2543/00509; B65D 2543/00296; B65D 2543/00027; A47J 47/14; B29L 2031/7162; B29C 2791/006; B29C 51/30
USPC ............ 220/4.21, 4.22, 4.23, 839, 836, 837, 220/810, 339, 380; 264/320, 319; 429/106; 206/499, 505, 515, 503, 504
See application file for complete search history.

(56) References Cited

U.S. PATENT DOCUMENTS 1,941,050 A 12/1933 Punte
2,302,045 A 11/1942 Neumann et al.
(Continued)

FOREIGN PATENT DOCUMENTS

CH 619665 10/1980
DE 2444416 A1 4/1976
(Continued)

OTHER PUBLICATIONS

Throne, Thermoforming, 1987, pp. 21-29, Hanser Publishers, Munich, Germany.
(Continued)

*Primary Examiner* — Robert J Hicks
*Assistant Examiner* — Kareen Rush
(74) *Attorney, Agent, or Firm* — William W. Letson

(57) ABSTRACT

A container that is a cup portion having a maximum gauge of less than 35 mils provided with a bottom panel, a sidewall and a sealing brim which defines an annular cup sealing surface; and a lid having a maximum gauge of less than 35 mils with a sealing rim defining an annular lid sealing surface; wherein the cup portion and lid portion are thermoformed such that the annular cup sealing surface and the annular lid sealing surface cooperate to form a seal extending around the assembled container and wherein the container does not leak when tested using the Leak Test Method 1.

39 Claims, 17 Drawing Sheets
(4 of 17 Drawing Sheet(s) Filed in Color)

(51) Int. Cl.
*B65D 43/16* (2006.01)
*B29C 51/10* (2006.01)
*B29C 51/30* (2006.01)
*B29L 31/56* (2006.01)
*B29L 31/00* (2006.01)

(52) U.S. Cl.
CPC .............. *B65D 2543/00101* (2013.01); *B65D 2543/00296* (2013.01); *B65D 2543/00509* (2013.01); *B65D 2543/00537* (2013.01); *B65D 2543/00555* (2013.01); *B65D 2543/00842* (2013.01); *B65D 2543/00907* (2013.01)

(56) References Cited

U.S. PATENT DOCUMENTS

| | | | |
|---|---|---|---|
| 2,825,450 A | 3/1958 | Lambert | |
| 3,021,001 A | 2/1962 | Donofrio | |
| 3,054,679 A | 9/1962 | Bradford | |
| 3,115,266 A | 12/1963 | Poupitch | |
| 3,389,825 A | 6/1968 | Whiteford | |
| 3,420,431 A | 1/1969 | Donovan | |
| 3,448,888 A | 6/1969 | Smith et al. | |
| 3,616,962 A * | 11/1971 | Phipps | 220/789 |
| 3,647,055 A | 3/1972 | Pfaff | |
| 3,715,856 A | 2/1973 | Borel | |
| 3,757,983 A | 9/1973 | McCarthy | |
| 4,054,207 A | 10/1977 | Lazure et al. | |
| 4,105,121 A | 8/1978 | Mascetti | |
| 4,215,797 A | 8/1980 | Chen | |
| 4,296,863 A | 10/1981 | Stokkers | |
| 4,398,634 A | 8/1983 | McClosky | |
| 4,421,244 A | 12/1983 | Van Melle | |
| 4,593,819 A | 6/1986 | Will | |
| 4,753,766 A | 6/1988 | Pinsolle et al. | |
| 4,798,133 A | 1/1989 | Johnson | |
| 4,829,006 A | 5/1989 | Smith et al. | |
| 4,875,620 A | 10/1989 | Lane, Sr. | |
| 5,012,971 A | 5/1991 | Cozzi et al. | |
| 5,024,067 A | 6/1991 | Maier, II | |
| 5,037,000 A | 8/1991 | Selame | |
| 5,160,767 A | 11/1992 | Genske et al. | |
| 5,221,040 A | 6/1993 | Sorenson | |
| 5,242,696 A * | 9/1993 | McDevitt | 426/106 |
| 5,300,748 A | 4/1994 | Colombo | |
| 5,320,279 A | 6/1994 | Giblin et al. | |
| 5,332,147 A | 7/1994 | Sorenson | |
| 5,334,272 A | 8/1994 | Takata et al. | |
| 5,366,104 A | 11/1994 | Armstrong | |
| 5,377,860 A | 1/1995 | Littlejohn et al. | |
| 5,398,068 A | 3/1995 | Liu et al. | |
| 5,409,127 A | 4/1995 | Straford et al. | |
| 5,417,365 A | 5/1995 | Lindsay | |
| 5,456,379 A | 10/1995 | Krupa et al. | |
| 5,531,349 A | 7/1996 | Wojcik et al. | |
| 5,543,104 A | 8/1996 | Stratford et al. | |
| 5,584,408 A | 12/1996 | Orkisz | |
| D388,325 S | 12/1997 | Tucker et al. | |
| 5,702,017 A | 12/1997 | Gonclaves | |
| D390,109 S | 2/1998 | Tucker et al. | |
| 5,720,406 A | 2/1998 | Fassbind et al. | |
| 5,722,553 A | 3/1998 | Hovatter | |
| 5,897,011 A | 4/1999 | Brilliant et al. | |
| 5,904,263 A | 5/1999 | St. Pierre et al. | |
| 5,938,068 A | 8/1999 | Atkins et al. | |
| 5,979,690 A | 11/1999 | Hartley | |
| 6,000,535 A | 12/1999 | Berk et al. | |
| 6,032,827 A | 3/2000 | Zettle et al. | |
| 6,047,819 A | 4/2000 | Borst et al. | |
| 6,076,698 A | 6/2000 | Magidson | |
| 6,170,696 B1 | 1/2001 | Tucker et al. | |
| 6,211,500 B1 | 4/2001 | Cochran, II et al. | |
| 6,211,501 B1 | 4/2001 | McCarthy et al. | |
| 6,467,647 B1 | 10/2002 | Tucker et al. | |
| 6,629,834 B2 | 10/2003 | Cargile et al. | |
| 6,805,659 B2 | 10/2004 | Bohrer | |
| 6,910,599 B2 | 6/2005 | Tucker et al. | |
| D530,197 S | 10/2006 | LaMasney | |
| D536,992 S | 2/2007 | Garg et al. | |
| 7,246,714 B2 | 7/2007 | Garg et al. | |
| 7,258,905 B2 | 8/2007 | Whitmore et al. | |
| 7,261,219 B2 | 8/2007 | Tucker et al. | |
| 7,549,551 B2 | 6/2009 | Tyberghein | |
| 7,597,206 B2 * | 10/2009 | Atkins et al. | 220/4.23 |
| 7,685,677 B2 | 3/2010 | Garg et al. | |
| 7,691,301 B2 | 4/2010 | Tyberghein | |
| 7,775,395 B2 | 8/2010 | Zeiler et al. | |
| 7,922,021 B2 | 4/2011 | Golden | |
| D639,156 S | 6/2011 | Guillemin et al. | |
| D640,544 S | 6/2011 | Sifuentes et al. | |
| D640,547 S | 6/2011 | Guillemin et al. | |
| 7,963,421 B2 | 6/2011 | Zeiler et al. | |
| 8,308,021 B2 * | 11/2012 | Turvey et al. | 220/793 |
| 2001/0052479 A1 | 12/2001 | Gaffney et al. | |
| 2002/0037378 A1 | 3/2002 | Littlejohn et al. | |
| 2002/0088737 A1 | 7/2002 | Stepp | |
| 2003/0141218 A1 | 7/2003 | Stephens et al. | |
| 2003/0185948 A1 | 10/2003 | Garwood | |
| 2003/0230582 A1 | 12/2003 | Whitmore et al. | |
| 2004/0164076 A1 | 8/2004 | Baker et al. | |
| 2004/0232026 A1 | 11/2004 | Geoking et al. | |
| 2005/0011898 A1 | 1/2005 | Van Handel et al. | |
| 2005/0035118 A1 * | 2/2005 | Garg | B65D 43/162 220/4.23 |
| 2007/0012710 A1 * | 1/2007 | Vovan | 220/793 |
| 2007/0246469 A1 | 10/2007 | Whitmore et al. | |
| 2007/0295721 A1 | 12/2007 | Van Handel et al. | |
| 2007/0295741 A1 | 12/2007 | Baker et al. | |
| 2008/0023471 A1 | 1/2008 | Garg et al. | |
| 2008/0023882 A1 | 1/2008 | Garg et al. | |
| 2010/0224643 A1 | 9/2010 | Daggett | |
| 2010/0320210 A1 | 12/2010 | Cimmerer et al. | |
| 2011/0049154 A1 * | 3/2011 | Michalsky | 220/288 |
| 2011/0068105 A1 | 3/2011 | Pohlman et al. | |
| 2011/0315704 A1 | 12/2011 | Everson | |
| 2012/0024859 A1 | 2/2012 | Longoni et al. | |

FOREIGN PATENT DOCUMENTS

| | | |
|---|---|---|
| DE | 2653906 A1 | 6/1978 |
| DE | 10012364 A1 | 9/2001 |
| EP | 0275102 A2 | 7/1988 |
| EP | 0284349 A2 | 9/1988 |
| EP | 0348142 A2 | 12/1989 |
| EP | 0412029 A1 | 2/1991 |
| EP | 0605082 A1 | 7/1994 |
| EP | 0841150 A2 | 5/1998 |
| FR | 1278149 | 12/1961 |
| FR | 1392947 | 2/1965 |
| FR | 2763314 A1 | 11/1998 |
| GB | 649541 | 1/1951 |
| GB | 2156658 A | 10/1985 |
| RU | 19027 U1 | 8/2001 |
| WO | 03/106276 A1 | 12/2003 |
| WO | 2005/068306 A1 | 7/2005 |
| WO | 2005/068307 A2 | 7/2005 |
| WO | 2012/006739 A1 | 1/2012 |

OTHER PUBLICATIONS

Anchor Packaging—Culinary Classics http://www.anchorpackaging.com/eMerchantPro/pc/Culinary-Classics-c12.htm, 2 pages, Jun. 30, 2011.
Anchor Packaging—MicroRaves Hot Dog Hinged Clamshell—http://www.anchorpackaging.com/eMerchantPro/pc/MicroRaves-Hog-Dog.Hinges.Clamshell-20p128.htm, 1 page, Jun. 30, 2011.
Anchor Packaging—Culinary Basics 9x9 1-Comp. Base/1-Comp. Lid, Hinged Clamshell—http://www.anchorpackaging.com/eMerchantPro/pc/Culinary-Basics-9x9-1-Comp-Base-1-Comp-Lid-Hinged-Clamshell-11p61.htm, 1 page, Jun. 30, 2011.
Anchor Packaging—Culinary Basics 9.5x10.5 1-Cmp. Base/1-Cmp. Lid, Hinged Clamshell—http://www.anchorpackaging.com/

(56) References Cited

OTHER PUBLICATIONS eMerchantPro/pc/Culinary-Basics-9-5×10-5-1-Cmp-Base1-Cmp-Lid-Hinged-Clamshell-11p62.htm, 1 page, Jun. 30, 2011.
Anchor Packaging—Culinary Classic 6×9 1-Comp. Base/1-Comp. Lid, Hinged Clamshell—http://www.anchorpackaging.com/eMerchantPro/pc/Culinary-Classic-6×9-1-Comp-Base-1-Comp-Lid-Hinged-Clamshell-12p63.htm, 1 page, Jun. 30, 2011.
Encyclopedia of Polymer Science and Engineering (2nd Edition), vol. 6, 1986, pp. 383-522, Wiley.
European Patent Office, International Search Report of the International Searching Authority for PCT/US03/17910, mailing date Sep. 29, 2003.
European Patent Office, International Search Report and Written Opinion of the International Searching Authority for PCT/US2004/043045, mailing date Mar. 17, 2005.
European Patent Office, International Search Report and Written Opinion of the International Searching Authority for PCT/US2005/000240, mailing date Jun. 28, 2005.
Decision of granting a patent for invention for Russian Application No. 2006128604, mailing date Feb. 24, 2009.

* cited by examiner

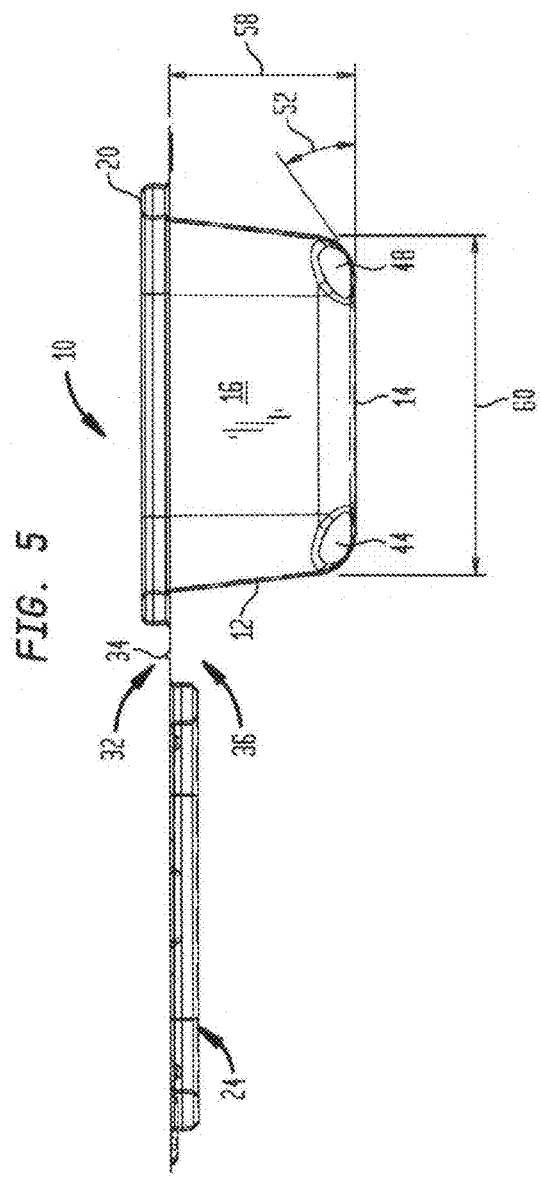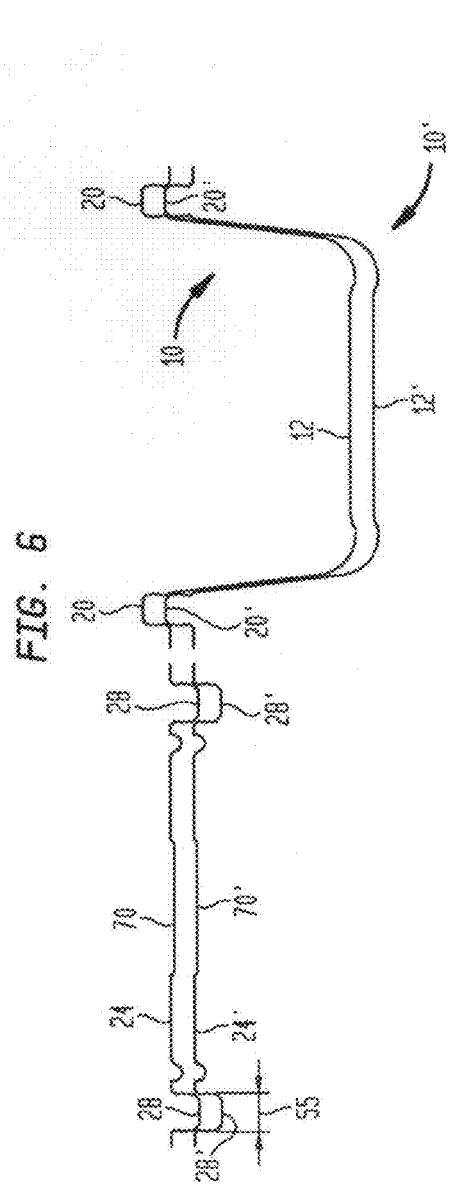

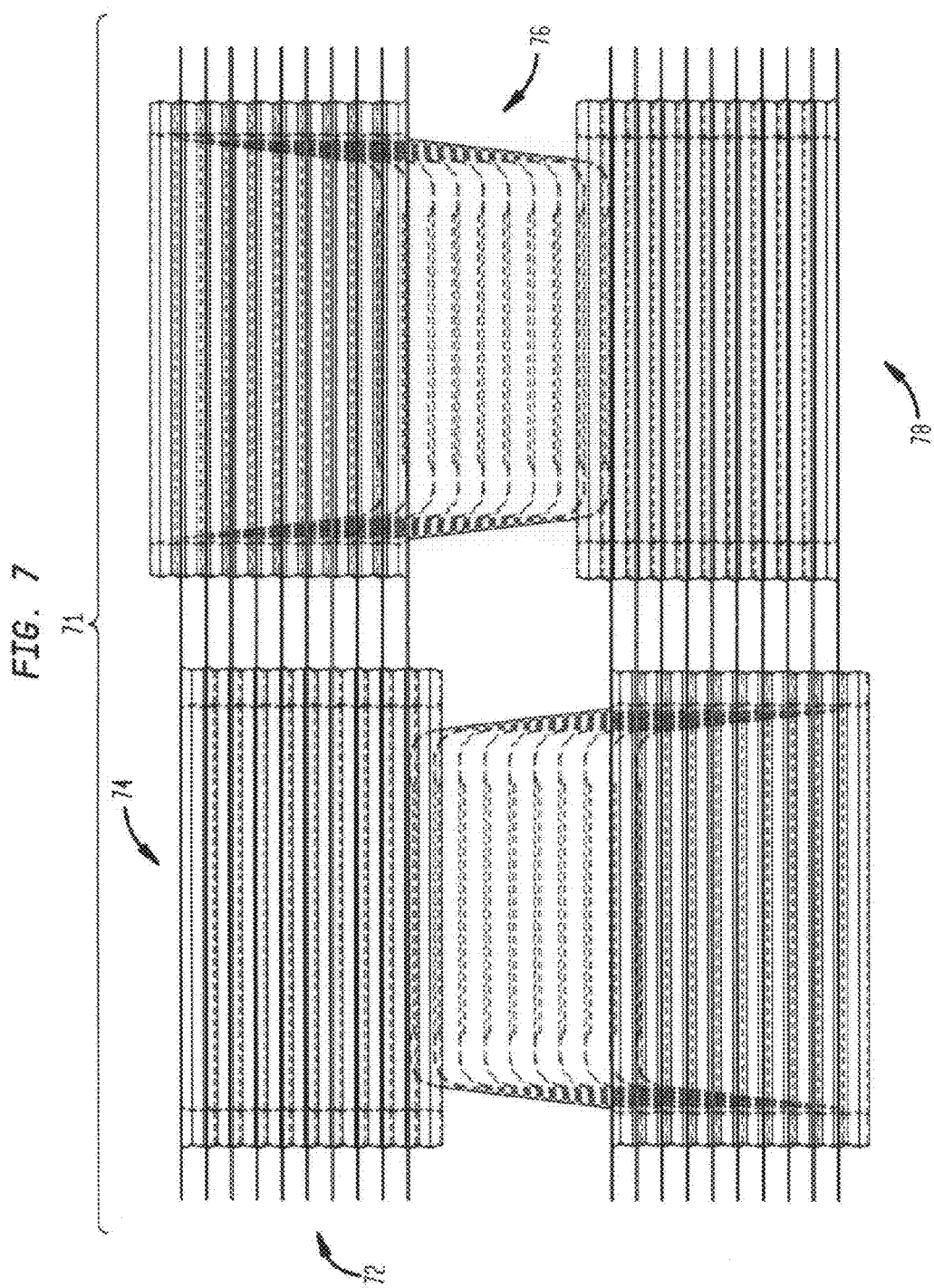

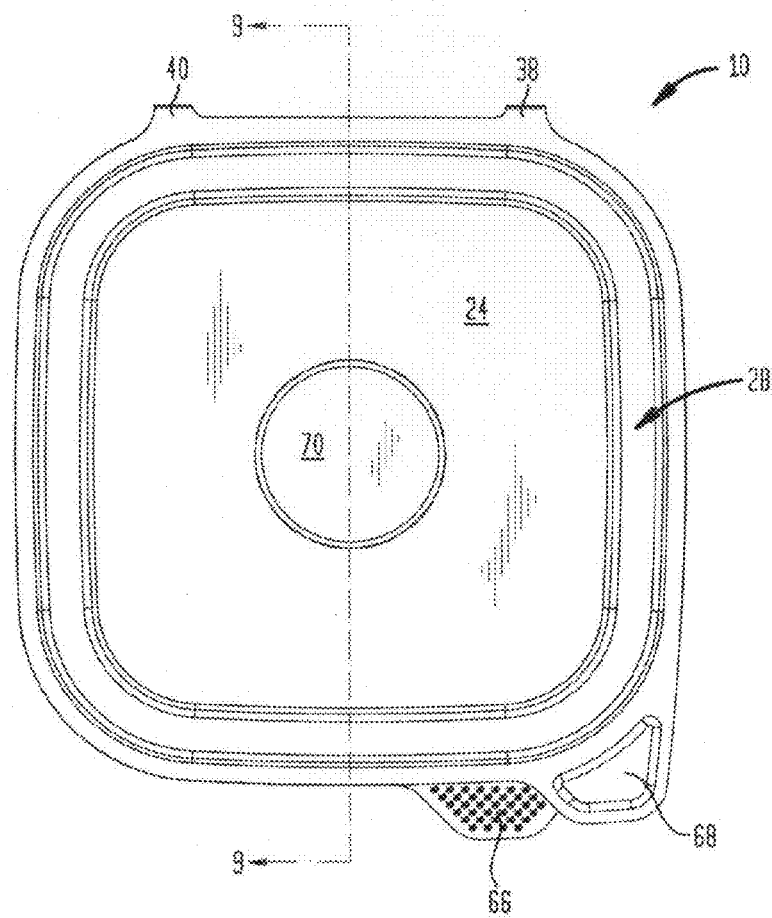

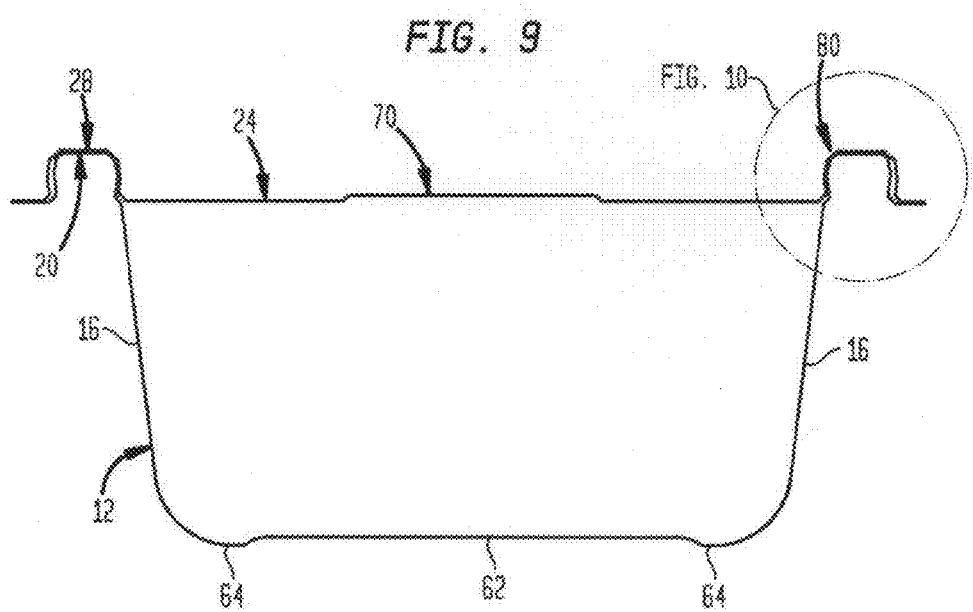

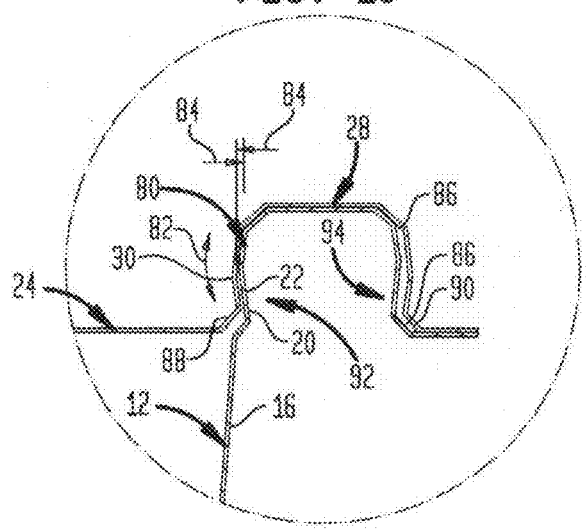
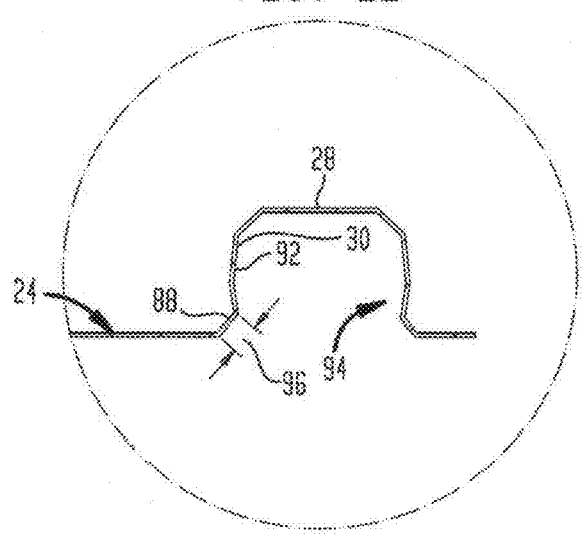
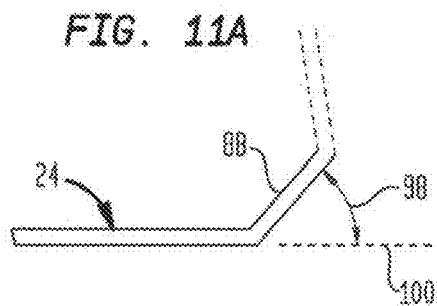

SEALABLE SNACK CONTAINER

CROSS-REFERENCE TO RELATED APPLICATION

This application claims priority to U.S. Provisional Patent Application No. 61/378,229 filed Aug. 30, 2010, the disclosure of which is incorporated herein in its entirety by this reference.

TECHNICAL FIELD

The present invention relates to lidded thermoformed containers.

BACKGROUND OF THE INVENTION

Containers for food storage are known. In many instances food storage containers are injection-molded which makes it possible to incorporate relatively complex molded-in features such as living hinges, freshness indicators and so forth. In this regard, see United States Patent Application Publication No. US 2004/0232026 of Goeking et al., entitled "Microwaveable Food Storage Container with Freshness Indicator and Steam Vent".

A thermoformed food container is shown in U.S. Pat. No. 7,258,905 to Whitmore et al., entitled "Sealable Food Container With Improved Lidding and Stacking Features" which includes a base such as a plate or platter and a domed lid. While the lid and base include sealing features, it is apparent to one of skill in the art that a liquid-proof surface-to-surface, interference-fit seal is not readily achieved in connection with lidded thermoformed products because, in part, the base and lid are formed separately from different sheet stock in different forming tools. Gauge and mold variations as well as different forming parameters make tolerance control exceedingly difficult.

If a lid is too tight, the lid will either not easily fit the container base (if it fits at all), or when too much force is applied, crush the container; leading to extreme consumer frustration in either case. Accordingly, existing lidded thermoformed containers oftentimes have a base made of relatively heavy gauge material, while the lid is made of lighter sheet stock and the container is designed to have a relatively "light" capping force in order to avoid the foregoing problems as dimensional variation occurs during manufacturing. The seal thus has large tolerances and sealing of the container is severely compromised.

While liquid-proof and/or airtight seals are highly desirable, lightweight thermoformed containers are particularly difficult to lid tightly so that they are liquid-proof and/or airtight inasmuch as the capping force may crush the container unless heavyweight stock is used. See United States Patent Application Publication No. US 2007/0295721 of Van Handel et al., entitled "Sealable Portion Cups and Lids Therefor".

Another desirable feature in single use and multi-use sealable container is a lid attached to the base or cup so that it is readily available and will not be misplaced. A problem with this arrangement is counter-top stability inasmuch as the weight of a lid tends to tip the container base. United States Patent Application Publication No. US 2003/0230582 of Whitmore et al., entitled "Separable Containers Arranged in Arrays With Integrally Formed Lids" shows thermoformed containers with hinged lids attached to cup portions. The hinge is a relatively stiff plastic hinge which lasts only a limited number of opening/closing cycles. Because of hinge stiffness, the hinge transmits torque due to the weight of the lid and makes a single container unstable on a counter-top as disclosed in the '582 publication. To ameliorate this problem, the product of the '582 publication is utilized in multi-container, separable arrays where the lids and cups are arranged so that the weight balances to make the arrays of containers counter-top stable; however, the arrangement is not adapted for using one container at a time as is frequently required.

SUMMARY OF INVENTION

There is provided a container that is a cup portion having a maximum gauge of less than 35 mils provided with a bottom panel, a sidewall and a sealing brim which defines an annular cup sealing surface; and a lid having a maximum gauge of less than 35 mils with a sealing rim defining an annular lid sealing surface; wherein the cup portion and lid portion are thermoformed such that the annular cup sealing surface and the annular lid sealing surface cooperate to form a seal extending around the assembled container and wherein the container does not leak when tested using the Leak Test Method 1.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is described in detail below with reference to the appended drawings, wherein like numerals designate similar parts. In the drawings:

FIG. 5 is an elevation of the container of FIGS. 1 through 4 as viewed from a side perpendicular to the hinge axis;

FIG. 6 is a schematic view illustrating stacking of containers of the present invention;

FIG. 7 is a depiction of an ensemble of containers packaged in cubed form for distribution;

FIG. 8 is a top view of a container of the invention, wherein the lid is capped to the container cup;

FIG. 9 is a cross-section elevation of the container of FIG. 8, also in a closed position;

FIGS. 10 and 11 are diagrams illustrating sealing features of containers of the invention;

FIG. 11a is a schematic diagram illustrating the chamfer angle of the chamfered lip of the brim of the lid;

DETAILED DESCRIPTION OF THE INVENTION

Figure 1:
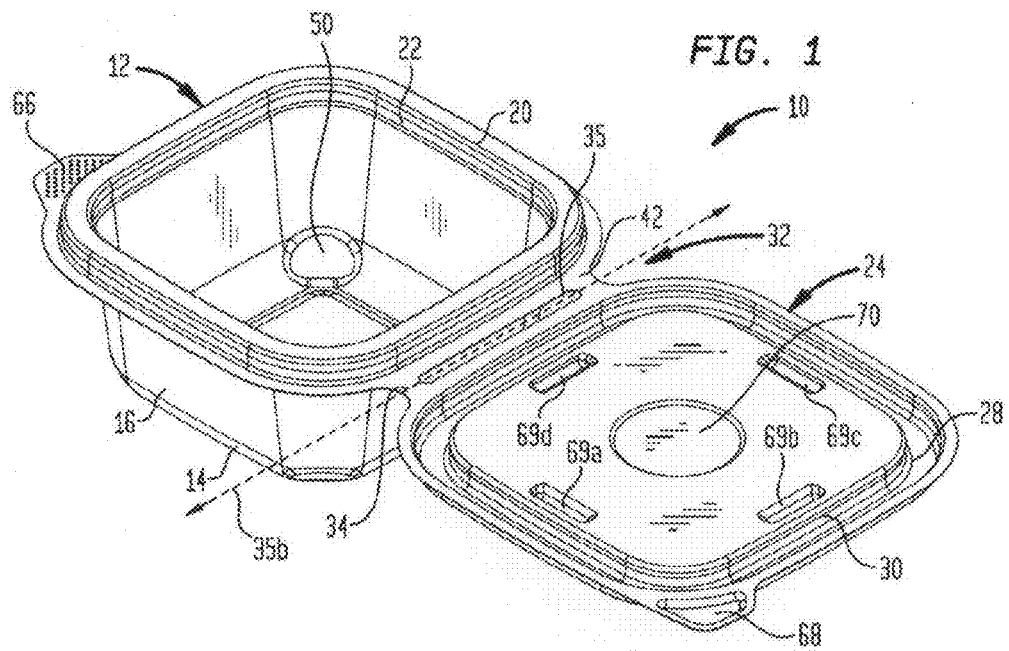
FIG. 1 is a top perspective view of a container of the present invention in an open position.

The invention is described in detail below with reference to numerous embodiments for purposes of exemplification and illustration only. Modifications to particular embodiments within the spirit and scope of the present invention, set forth in the appended claims, will be readily apparent to those of skill in the art.

Unless more specifically defined below, terminology as used herein is given its ordinary meaning.

A "substantially elastic" hinge refers to a living hinge which is durable to at least 250 180° open/close operation; while a relatively pliant or relatively pliable hinge is incapable without an intervening external force of sustaining a hinge torque sufficient to support a lid in a horizontal position relative to the cup. A lid attached to a cup rotates "substantially downwardly" when it rotates downwardly as at least 15° from a horizontal position, in some embodiments the lid rotates at least 25° or at least 35° downwardly from a horizontal position. A "freely rotating hinge" is unable of sustaining a hinge torque sufficient to provide substantial resistance rotation.

The terminology "interference-fit seal" refers to a seal between sealing members which are configured such that they are urged into engagement by their geometries, typically involving a negative draft. One sealing member thus has a larger dimension or dimensions in the free state than the dimension or dimensions of the cooperating part with which it forms a seal. When the interference-fit seal is formed, the sealing members become the same size and develop a seal through elastic compression, plastic movement of material, or both, much like interference-fit class 5 threads. See Machinery's Handbook, R. Green, Ed., 24.sup.th edition, Industrial Press. In some embodiments, the lids and cups form substantially continuous seals between them so that the containers are Liquid-tight; it being understood that the seal, while highly effective, especially when viewed in light of the low cost nature of the articles, is of course less than perfect where the seal formed might allow a few drops of moisture to penetrate when a sealed container is partially filled with water and shaken; but compression, effort and/or agitation is required to remove more than a few drops of liquid. The containers are thus also suitable for liquid or semi-liquid sauces, condiments, dressings, side dishes and so forth that are prepared and fresh-packaged shortly before consumption.

"Liquid-tight" means the container does not leak as determined by the Leak Test Method 1 described herein. "Air-tight" means the container is capable of expanding and holding an expanded shape for at least 5 minutes upon capping as described herein.

As used herein the terminology "polypropylene resin" or "polypropylene composition" or like terminology refers to a composition which is predominately (more than 50 mole %) made up of propylene repeat units and includes melt blends with other resins and additives. Likewise, polyethylene resins are mostly ethylene repeat units while polyethylene terephthalate resins are mostly ethylene terephthalate repeat units. An ethylene/propylene copolymer contains both ethylene and propylene repeat units in the resin and may be made up primarily of repeat units of either species.

In some embodiments, a wide variety of thermoformable, microwavable materials may be used to make the containers described herein. When a material is described herein as being "a component", it is understood to contemplate being 100%, at least 90%, at least 75%, at least 50%, at least 25%, at least 10%, at least 5%, or at least 1% by weight of all the compositions used to make the containers described herein. In some embodiments, nucleated polypropylene is used as a component of the containers described herein. In some embodiments, polypropylenes used as a component of the container described herein are selected from the group consisting of isotactic polypropylene, and copolymers of propylene and ethylene, for example, wherein the ethylene moiety is less than about 10% of the units making up the polymer, and mixtures thereof. In some embodiments, polymers used are isotactic polypropylenes with melt-flow indices of from about 20 to about 100, in some embodiments between about 30 and 60. In some embodiments, the resin from which the containers are made includes polypropylene melt blended with a polyethylene component. In some embodiments, polyethylene component may be any suitable polyethylene such as HDPE, LDPE, MDPE, LLDPE or mixtures thereof.

In some embodiments, various polyethylene polymers which may be used with or without polypropylene and are described at length in the Encyclopedia of Polymer Science & Engineering (2nd Ed.), Vol. 6; pp: 383-522, Wiley, 1986; the disclosure of which is incorporated herein by reference. HDPE refers to high density polyethylene which is substantially linear and has a density of generally greater than 0.94 up to about 0.97 g/cc. LDPE refers to low density polyethylene which is characterized by relatively long chain branching and a density of about 0.912 to about 0.925 g/cc. LLDPE or linear low density polyethylene is characterized by short chain branching and a density of from about 0.92 to about 0.94 g/cc. Finally, intermediate density polyethylene (MDPE) is characterized by relatively low branching and a density of from about 0.925 to about 0.94 g/cc. In some embodiments, any of the above mentioned polymers may be used as a component in the herein described containers.

In some embodiments, polypropylene/polyethylene copolymers with higher polyethylene content or a polyethylene based composition are used. In some embodiments, polyethylene terephthalate based compositions is used. In still further embodiments, any other suitable polymeric composition is used so long as the composition is sufficiently resilient and is preferably microwavable.

"Thermoforming", "thermoformed" and like terminology refers generally to a forming process involving draping of a softened sheet over a shaping mold. In the more advanced form, thermoforming is the automatic high speed positioning of a sheet having an accurately controlled temperature into a pneumatically actuated forming station whereby the article's shape is defined by the mold, followed by trimming and regrind collection as is well known in the art. Still other alternative arrangements include the use of drape, vacuum, pressure, free blowing, matched die, billow drape, vacuum snap-back, billow vacuum, plug assist vacuum, reverse draw with plug assist, pressure bubble immersion, trapped sheet, slip, diaphragm, twin-sheet cut sheet, twin-sheet roll-fed forming or any suitable combinations of the above. Details are provided in J. L. Throne's book, Thermoforming, published in 1987 by Coulthard. In some embodiments, the containers described herein are thermoformed by any means described herein or by any thermoforming means that are otherwise well known in the art.

Pages 21 through 29 of that book are incorporated herein by reference. Suitable alternate arrangements also include a pillow forming technique which creates a positive air pressure between two heat softened sheets to inflate them against a clamped male/female mold system to produce a hollow product. Suitable formed articles are trimmed in line with a cutting die and regrind is optionally reused since the material is thermoplastic in nature. Other arrangements for productivity enhancements include the simultaneous forming of multiple articles with multiple dies in order to maximize throughput and minimize scrap. Articles that are thermoformed should be designed so as to permit the die section to be parted free of the molded articles without undue interference with the surfaces of the articles. The surfaces of such articles generally include a so-called positive "draft" with respect to the direction in which the die sections are moved during parting to insure that there is little or no interference between the molded article and the interior surfaces of the die sections during parting. Interference between the articles and the dies is commonly known as "negative draft". The draft may be thought of as the difference between the upper lateral span of a mold cavity and that span below it. A positive draft allows the pattern to be pulled cleanly from the mold, however, undercuts inherently have a negative draft.

In some embodiments, container 10 has a cup portion 12 provided with a bottom panel 14, a sidewall 16 as well as a sealing brim 20 which defines an annular cup sealing surface 22. Container 10 is also provided with a lid 24 which in some embodiments has a generally planar top panel 26 as well as a sealing rim 28 defining an annular lid sealing surface 30.

Figure 2:
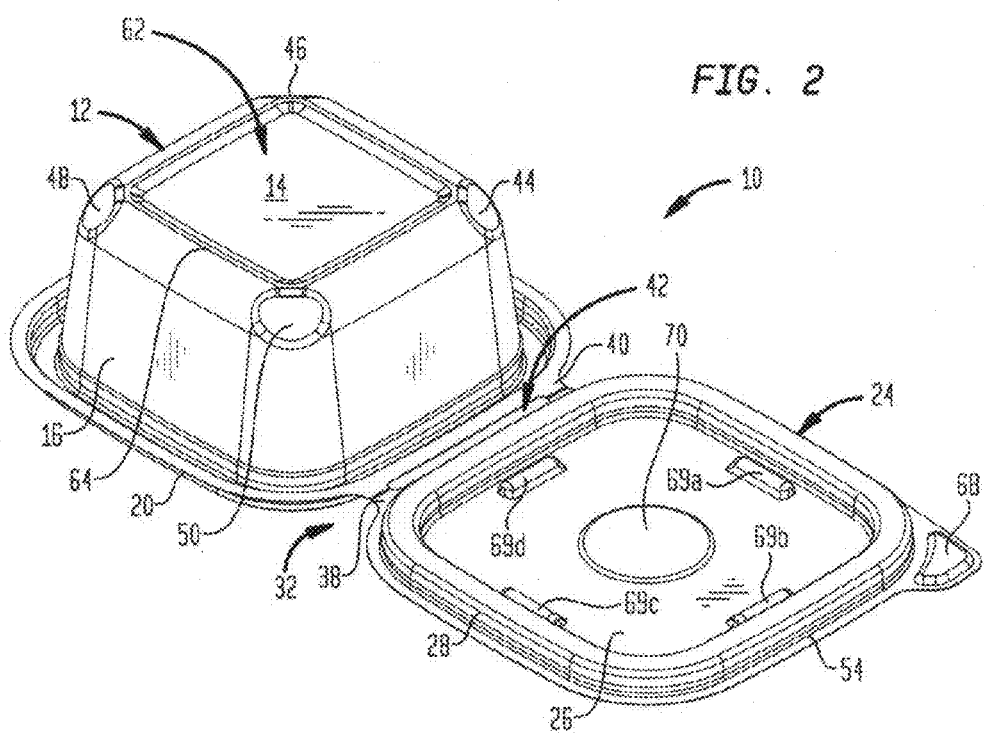
FIG. 2 is a bottom perspective view of the container of FIG. 1 also in an open position.
Figure 3:
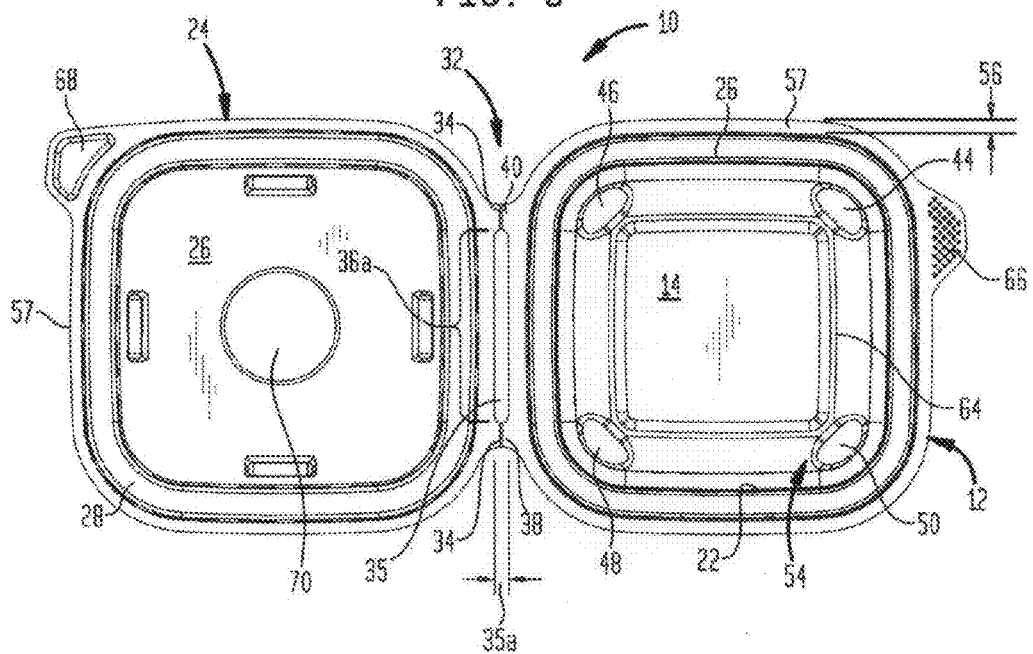
FIG. 3 is a top plan view of the container of FIG. 1, wherein the container is in an open position.
Figure 4:
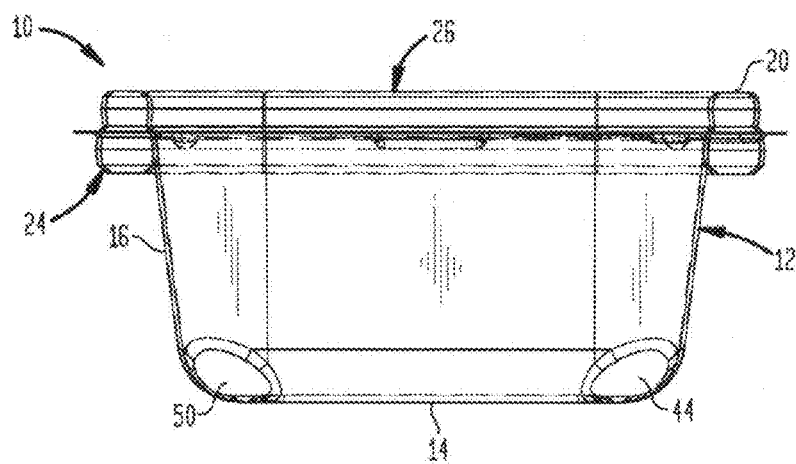
FIG. 4 is an elevation of the container of FIGS. 1 through 3 as viewed along the edge of the cup opposite the container hinge.

In some embodiments, lid 24 of container 10 is attached to cup portion 12 by way of a hinge portion 32 which defines a hinge 34 therebetween. In some embodiments, hinge 34 is a substantially elastic hinge. In some embodiments, this includes an arched profile 36 which is in some embodiments shaped and coined during thermoforming. In some embodiments, hinge 34 is coined in the mold while the material is hot, that is, two pieces of metal meet at a specified gap to thin the material creating an arched profile and hinge. In some embodiments, a slug of material is cut from the center of hinge portion 32 to remove memory and create a cutaway portion 35, giving the hinge a "dead" or "floppier" performance. In some embodiments, the potion of material cut from the center of the hinge potion is at least 0.5 inches long (direction parallel to axis of rotation of the hinge shown generally at 35b), at least 1 inch long, at least 1.5 inches long, at least 2 inches long, at least 3 inches long, or at least 4 inches long. In some embodiments, the potion of material cut from the center of the hinge potion is at least 0.05 inches wide (direction perpendicular to axis of rotation of the hinge), at least 0.1 inches wide, at least 0.25 inches wide, at least 0.5 inches wide, or at least 1 inches wide. In some embodiments, the portions 38, 40 of hinge 34 that are kept intact are 0.05 inches to 1 inch long (direction parallel to the axis of rotation), 0.1 to 0.5 inches long, or 0.1 to 0.25 inches long. In some embodiments it is believed that keeping the two outside portions 38, 40 of the hinge, closing alignment is maintained between cup portion 12 and lid 24 as the container is closed/reopened/reclosed. In some embodiments where the thermoformed container is trimmed with a die, the width 35a of cutaway 35 is at least 0.15 inches. In some embodiments, steel rule trimming or machined metal pinch trimming is used. In some embodiments, a land at 42 is provided for a cutaway receiver or die. The axis of rotation of hinge 34 is shown in FIG. 2 generally at 35b.

In some embodiments, the container has a maximum gauge of less than 50 mils, less than 45 mils, less than 40 mils, less than 35 mils, less than 30 mils, less than 25 mils, less than 20 mils, less than 15 mils, or less than 10 mils. In some embodiments at least 90% of the container has a maximum gauge of less than 50 mils, less than 45 mils, less than 40 mils, less than 35 mils, less than 30 mils, less than 25 mils, less than 20 mils, less than 15 mils, or less than 10 mils. In some embodiments the container has a maximum gauge between 10 mils and 50 mils, between 10 mils and 35 mils, between 10 mils and 25 mils, between 15 mils and 50 mils, between 15 mils and 35 mils, between 15 mils and 25 mils, between 20 mils and 50 mils, between 20 mils and 35 mils, or between 20 mils and 25 mils. In some embodiments at least 90% of the container has a maximum gauge between 10 mils and 50 mils, between 10 mils and 35 mils, between 10 mils and 25 mils, between 15 mils and 50 mils, between 15 mils and 35 mils, between 15 mils and 25 mils, between 20 mils and 50 mils, between 20 mils and 35 mils, or between 20 mils and 25 mils.

In some embodiments, the cup portion of the container has a maximum local gauge of less than 50 mils, less than 45 mils, less than 40 mils, less than 35 mils, less than 30 mils, less than 25 mils, less than 20 mils, less than 15 mils, or less than 10 mils. In some embodiments at least 90% of the cup portion of the container has a maximum gauge of less than 50 mils, less than 45 mils, less than 40 mils, less than 35 mils, less than 30 mils, less than 25 mils, less than 20 mils, less than 15 mils, or less than 10 mils. In some embodiments the cup portion of the container has a maximum gauge between 10 mils and 50 mils, between 10 mils and 35 mils, between 10 mils and 25 mils, between 15 mils and 50 mils, between 15 mils and 35 mils, between 15 mils and 25 mils, between 20 mils and 50 mils, between 20 mils and 35 mils, or between 20 mils and 25 mils. In some embodiments at least 90% of the cup portion of the container has a maximum gauge between 10 mils and 50 mils, between 10 mils and 35 mils, between 10 mils and 25 mils, between 15 mils and 50 mils, between 15 mils and 35 mils, between 15 mils and 25 mils, between 20 mils and 50 mils, between 20 mils and 35 mils, or between 20 mils and 25 mils.

In some embodiments, the lid portion of the container has a maximum local gauge of less than 50 mils, less than 45 mils, less than 40 mils, less than 35 mils, less than 30 mils, less than 25 mils, less than 20 mils, less than 15 mils, or less than 10 mils. In some embodiments at least 90% of the lid portion of the container has a maximum gauge of less than 50 mils, less than 45 mils, less than 40 mils, less than 35 mils, less than 30 mils, less than 25 mils, less than 20 mils, less than 15 mils, or less than 10 mils. In some embodiments the lid portion of the container has a maximum gauge between 10 mils and 50 mils, between 10 mils and 35 mils, between 10 mils and 25 mils, between 15 mils and 50 mils, between 15 mils and 35 mils, between 15 mils and 25 mils, between 20 mils and 50 mils, between 20 mils and 35 mils, or between 20 mils and 25 mils. In some embodiments at least 90% of the lid portion of the container has a maximum gauge between 10 mils and 50 mils, between 10 mils and 35 mils, between 10 mils and 25 mils, between 15 mils and 50 mils, between 15 mils and 35 mils, between 15 mils and 25 mils, between 20 mils and 50 mils, between 20 mils and 35 mils, or between 20 mils and 25 mils.

In some embodiments, the container is thermoformed from a sheet stock having a starting maximum gauge of less than 50 mils, less than 45 mils, less than 40 mils, less than 35 mils, less than 30 mils, less than 25 mils, less than 20 mils, less than 15 mils, or less than 10 mils. In some embodiments the container is thermoformed from a sheet stock having a starting maximum gauge between 10 mils and 50 mils, between 10 mils and 35 mils, between 10 mils and 25 mils, between 15 mils and 50 mils, between 15 mils and 35 mils, between 15 mils and 25 mils, between 20 mils and 50 mils, between 20 mils and 35 mils, or between 20 mils and 25 mils.

In some embodiments, the cup portion of the container is thermoformed from a sheet stock having a starting maximum gauge less than 50 mils, less than 45 mils, less than 40 mils, less than 35 mils, less than 30 mils, less than 25 mils, less than 20 mils, less than 15 mils, or less than 10 mils. In some embodiments the cup portion of the container is thermoformed from a sheet stock having a starting maximum gauge between 10 mils and 50 mils, between 10 mils and 35 mils, between 10 mils and 25 mils, between 15 mils and 50 mils, between 15 mils and 35 mils, between 15 mils and 25 mils, between 20 mils and 50 mils, between 20 mils and 35 mils, or between 20 mils and 25 mils.

In some embodiments, the lid portion of the container is thermoformed from a sheet stock having a starting maximum gauge less than 50 mils, less than 45 mils, less than 40 mils, less than 35 mils, less than 30 mils, less than 25 mils, less than 20 mils, less than 15 mils, or less than 10 mils. In some embodiments the lid portion of the container is thermoformed from a sheet stock having a starting maximum gauge between 10 mils and 50 mils, between 10 mils and 35 mils, between 10 mils and 25 mils, between 15 mils and 50 mils, between 15 mils and 35 mils, between 15 mils and 25 mils, between 20 mils and 50 mils, between 20 mils and 35 mils, or between 20 mils and 25 mils.

In some embodiments, the cup portion of the container has an interior volume less than 50 ounces, less than 40 ounces, less than 30 ounces, less than 25 ounces, less than 20 ounces, less than 15 ounces, less than 10 ounces, less than 5 ounces, or less than 2 ounces. In some embodiments, the cup portion of the container has an interior volume between 2 ounces and 50 ounces, between 2 ounces and 30 ounces, between 2 ounces and 25 ounces, between 2 ounces and 15 ounces, between 4 ounces and 50 ounces, between 4 ounces and 35 ounces, between 4 ounces and 25 ounces, between 4 ounces and 15 ounces, between 10 ounces and 50 ounces, between 10 ounces and 40 ounces, between 10 ounces and 30 ounces, or between 10 ounces and 20 ounces.

In some embodiments, the container has a capping force (measured using the Capping Force Method 1 described herein in lbs/lineal inch) of at least 0.1, 0.2, 0.3, 0.35, 0.4, 0.45, 0.48, 0.5, 0.6, or 0.7. In some embodiments, the container has a capping force (measured using the Capping Force Method 1 described herein in lbs/lineal inch) less than 1.0, 0.9, 0.8, 0.7, 0.6, 0.55, 0.5, 0.45, 0.4, or 0.3. In some embodiments, the container has a capping force (measured using the Capping Force Method 1 described herein in lbs/lineal inch) between any of the upper and lower limits previously described. In some embodiments, the container has a capping force (measured using the Capping Force Method 1 described herein in lbs/lineal inch) between 0.1 and 1, 0.3 and 1, 0.3 and 0.9, 0.35 and 1, 0.35 and 0.9, 0.35 and 0.8, 0.35 and 0.7, 0.4 and 1, 0.4 and 0.9, 0.4 and 0.8, 0.4 and 0.7, 0.45 and 1, 0.45 and 0.9, 0.45 and 0.8, 0.45 and 0.7, 0.5 and 1, 0.5 and 0.9, 0.5 and 0.8, or 0.5 and 0.7.

In some embodiments, the container has a leak capping force (measured using the Leak Capping Force Method 1 described herein in lbs/lineal inch) of at least 0.1, 0.2, 0.3, 0.35, 0.4, 0.45, 0.48, 0.5, 0.6, or 0.7. In some embodiments, the container has a leak capping force (measured using the Leak Capping Force Method 1 described herein in lbs/lineal inch) less than 1.0, 0.9, 0.8, 0.7, 0.6, 0.55, 0.5, 0.45, 0.4, or 0.3. In some embodiments, the container has a leak capping force (measured using the Leak Capping Force Method 1 described herein in lbs/lineal inch) between any of the upper and lower limits previously described. In some embodiments, the container has a leak capping force (measured using the Leak Capping Force Method 1 described herein in lbs/lineal inch) between 0.1 and 1, 0.3 and 1, 0.3 and 0.9, 0.35 and 1, 0.35 and 0.9, 0.35 and 0.8, 0.35 and 0.7, 0.4 and 1, 0.4 and 0.9, 0.4 and 0.8, 0.4 and 0.7, 0.45 and 1, 0.45 and 0.9, 0.45 and 0.8, 0.45 and 0.7, 0.5 and 1, 0.5 and 0.9, 0.5 and 0.8, or 0.5 and 0.7.

In some embodiments, the container has a crush force (measured using Crush Force Test Method 1 described herein in lbs of force) of at least 10, 15, 20, 25, 30, 35, 40, 45, 50, 55, 60 or 65. In some embodiments, the container has a crush force (measured using Crush Force Test Method 1 described herein in lbs of force)) less than 100, 90, 80, 70, 60, 50, 40, 35, 30, 25, 20, 15. In some embodiments, the container has a crush force (measured using Crush Force Test Method 1 described herein in lbs of force) between any of the upper and lower limits previously described. In some embodiments, the container has a crush force (measured using Crush Force Test Method 1 described herein in lbs of force) between 10 and 100, 10 and 70, 10 and 50, 10 and 40, 10 and 35, 10 and 30, 15 and 100, 15 and 70, 15 and 50, 15 and 40, 15 and 35, 15 and 30, 20 and 100, 20 and 70, 20 and 50, 20 and 40, 20 and 35, or 20 and 30.

In some embodiments, the container has a crush force/capping force ratio (measured using the Crush Force Method 1 and Capping Force Method 1 described herein) of at least 1, 2, 3, 4, 5, 10, or 15. In some embodiments, the container has a crush force/capping force ratio (measured using the Crush Force Method 1 and Capping Force Method 1 described herein) of less than 20, 15, 10, 5, 4, or 3. In some embodiments, the container has a crush force/capping force ratio (measured using the Crush Force Method 1 and Capping Force Method 1 described herein) between any of the upper and lower limits previously described. In some embodiments, the container has a crush force/capping force ratio (measured using the Crush Force Method 1 and Capping Force Method 1 described herein) between 1 and 20, 1 and 15, 1 and 10, 1 and 5, 1 and 4, 1 and 3, 2 and 20, 2 and 10, 2 and 5, or 2 and 4.

In some embodiments, it is contemplated to manufacture at least 1, 2, 3, or 4 consecutive packages of at least 2, 3, 4, 5, 6, 7, or 8 containers contain containers where all of the containers in the package have a capping force or leak capping force (measured using the Capping Force Method 1 or Leak Capping Force Method 1 described herein in lbs/lineal inch) of at least 0.1, 0.2, 0.3, 0.35, 0.4, 0.45, 0.48, 0.5, 0.6, or 0.7. In some embodiments, less than 20%, less than 10%, less than 5%, less than 1%, or 0% of the containers in the aforementioned packages leak as tested by Leak Test Method 1 described herein. In some embodiments, it is contemplated to manufacture at least 1, 2, 3, or 4 consecutive packages of at least 2, 3, 4, 5, 6, 7, or 8 containers contain containers where all of the containers in the package have a capping force or leak capping force (measured using the Capping Force Method 1 or Leak Capping Force Method 1 described herein in lbs/lineal inch) less than 1.0, 0.9, 0.8, 0.7, 0.6, 0.55, 0.5, 0.45, 0.4, or 0.3. In some embodiments, less than 20%, less than 10%, less than 5%, less than 1%, or 0% of the containers in the aforementioned packages leak as tested by Leak Test Method 1 described herein. In some embodiments, it is contemplated to manufacture at least 1, 2, 3, or 4 consecutive packages of at least 2, 3, 4, 5, 6, 7, or 8 containers contain containers where all of the containers in the package have a capping force or leak capping force (measured using the Capping Force Method 1 or Leak Capping Force Method 1 described herein in lbs/lineal inch) between any of the upper and lower limits previously described. In some embodiments, less than 20%, less than 10%, less than 5%, less than 1%, or 0% of the containers in the aforementioned packages leak as tested by Leak Test Method 1 described herein. In some embodiments it is contemplated to manufacture at least 1, 2, 3, or 4 consecutive packages of at least 2, 3, 4, 5, 6, 7, or 8 containers contain containers where all of the containers in the package have a capping force (measured using the Capping Force Method 1 or Leak Capping Force Method described herein in lbs/lineal inch) between 0.1 and 1, 0.3 and 1, 0.3 and 0.9, 0.35 and 1, 0.35 and 0.9, 0.35 and 0.8, 0.35 and 0.7, 0.4 and 1, 0.4 and 0.9, 0.4 and 0.8, 0.4 and 0.7, 0.45 and 1, 0.45 and 0.9, 0.45 and 0.8, 0.45 and 0.7, 0.5 and 1, 0.5 and 0.9, 0.5 and 0.8, or 0.5 and 0.7. In some embodiments, less than 20%, less than 10%, less than 5%, less than 1%, or 0% of the containers in the aforementioned packages leak as tested by Leak Test Method 1 described herein.

In some embodiments shown in FIGS. 1 through 5, a plurality of chamfered surfaces 44, 46, 48, 50 are provided at the corners of cup 12. In some embodiments, these surfaces are chamfered at an external angle 52 between 35° and 50° (in some embodiments this angle is 45°) from a plane defined by bottom panel 14 and chamfered at an external angle between 35° and 50° (in some embodiments, this angle is 45°) from the adjacent surfaces (i.e. the chamfered panels 44, 46, 48 and 50 form an internal angle at 54 between 130° and 145° (in some embodiments, this angle is 135°) with adjacent surfaces of cup 12. In some embodiments, angles 52, 54 are consistent about the peripheries of the chamfered corner panels. In some thermoformed embodiments, the material does not thin as much in the corners because the reduced draw-down; that is in some embodiments, panels 44, 46, 48 and 50 are thicker than adjacent areas of cup 12. In some embodiments, the panel structure flat surface is perpendicular to a typical impact.

In some embodiments, Cup portion 12 and lid 24 are formed from adjacent areas of one piece of sheet stock in the same tool at the same time. In some embodiments, a span 55 (FIG. 6 and following) of lid sealing rim 28 must be at least 0.1 inches, at least 0.25, or at least 0.5 inches wide. In some embodiments, span 55 is between 0.1 inches and 1 inch wide, or between 0.1 and 0.5 inches wide. In some embodiments, a benefit of being a significant span at 55 is that there is an area to grasp when the contents are hot. In some embodiments a Lip 57 extends horizontally around cup 12 and lid 24. In some embodiments, lip 57 has a distance 56 of least 0.05 inches, at least 0.1 inches or at least 0.25 inches.

In some embodiments, lip 57 has a distance 56 between 0.05 and 0.5 inches, between 0.05 and 0.25 inches, between 0.1 and 0.5 inches, or between 0.1 and 0.25 inches. In some embodiments, lip 57 is trimmed.

In some embodiments to further stability of the container, the depth to draw ratio of container 10, that is height 58/width 60 (FIG. 5), is less than 1, less 0.85, 0.75, or 0.6. In some embodiments, a recessed area 62 or "kick" is molded into the bottom panel 14 and provides a ridge 64 an example of which is seen in FIG. 9. If panel 14 is warped from the forming process or from trapped air, ridge 64 helps to reduce rolling of the container. In some embodiments, recessed area 62 has a surface area of between 1 and 10 inches$^2$, between 1 and 8 inches$^2$, between 1 and 4 inches$^2$, between 2 and 10 inches$^2$, or between 2 and 5 inches$^2$. In some embodiments, recessed area 62 has a surface area of at least 0.5 inches$^2$, at least 1.0 inches$^2$, at least 2 inches$^2$, or at least 4 inches$^2$.

In some embodiments, lid 24 and cup 12 are tabbed to facilitate easy opening. In some embodiments, tab 66 on cup 12 acts as a hold point, while tab 68 on lid 24 acts as a lift point and is wider than tab 66. In some embodiments, tab 68 is pulled from the outside corner to create the most available leverage. In some embodiments, texture is provided to tab 66 and/or a "lift" label to tab 68. In some embodiments, no tab is used.

In some embodiments, the containers are thus formed so that they are stackable, but will resist tight nesting so as to be inseparable. In some embodiments, the containers have stacking ridges 69a, 69b, 69c and 69d. Referring to FIG. 6, there is shown substantially two nested containers 10 and 10' stacked such that their lids 24, 24' and cups 12, 12' are partially nested. In some embodiments, the sealing areas of the cups and lids are undercut slightly so that they do not easily nest in complete surface-to-surface contact as is shown in FIG. 6, and provide an interference seal as shown in FIG. 10. In some embodiments, raised areas 70, 70' to assist in sealing the container as hereinafter described in more detail in connection with FIGS. 8-10.

In some embodiments, the containers are conveniently packaged or stored as shown in FIG. 7. In some embodiments, a packaged ensemble 71 of containers includes first stack 72 of containers (in some embodiments at least 2, at least 4, at least 5, at least 8, or at least 10) is oriented with the cup portion openings directed towards 74, while a second stack 76 (in some embodiments at least 2, at least 4, at least 5, at least 8, or at least 10) is placed on stack 72 with the cup openings toward 78. In this way 20 cups form a compact "cube" which is convenient for shipping, storage and distribution.

Referring now to FIGS. 8, 9, 10 and 11, the various features of some embodiments, including sealing features of some embodiments of the container 10 are illustrated further. FIG. 8 is a top view showing container 10 in a closed position wherein lid 24 is sealed to cup portion 12. In some embodiments, the container has a raised portion 70 on the lid. In some embodiments, raised portion 70 is a "push button" closure when pressed by one finger to close the container. In some embodiments, the raised portion helps expel air in the closure process and/or helps keep packaged food fresher longer.

FIG. 9 is an elevation section along plane 9-9 of FIG. 8 showing the cooperation of the various parts in a closed position of some embodiments of the present invention. FIG. 10 is an enlarged view at the brim of FIG. 9 as indicated which shows the interference-fit seal of some embodiments of container 10. In some embodiments, seal 80 is an interference-fit seal between sealing surface 22 of sealing brim 20 of cup portion and sealing surface 30 of lid 24. In some embodiments, surfaces 22 and 30 are in surface-to-surface interfacing contact entirely around the container over a contact distance or band width 82. In some embodiments, Seal width 82 is less than 100 mils, less than 80 mils, less than 60 mils, less than 50 mils, less than 40 mils or less than 30 mils. In some embodiments, the interference distance between the two parts is indicated at 84 and is less than 50 mils, less than 40 mils, or less than 30 mils and/or less than 25 mils per part, less than 20 mils per part or less than 15 mils per part, that is, the amount each part is compressed. Note that in some embodiments, interference occurs only at the seal, and that the sealing brim is otherwise non-interfering with the sealing rim of the lid as shown in FIG. 10. In some embodiments, the parts have clearance at the outer portions of the lid and base upon assembly of the container as indicated at 86.

In some embodiments, any type of seals may be used that is well known to one skilled in the art, including but not limited to, screw seals.

In some embodiments, lid 24 has chamfered corners at 88, 90 to facilitate closing of the container inasmuch as brim 20 of cup 12 and sealing rim 28 of lid 24 are undercut at 92, 94. In some embodiments, the chamfered corners have a chamfer length 96 of at least 5 mils or more. In some embodiments, the chamfered lip of lid 24 has a chamfer angle 98 with a horizontal line 100 of between 35° and 55° (in some embodiments the angle is 45°).

It will be appreciated by one of skill in the art that the sealable container of this invention may be fabricated in a variety of overall shapes; for instance, container 10 of FIGS. 1 though 11 has a generally rectangular (horizontal) cross section when viewed through the opening of the cup (plan view) as well as tapered sidewalls so that the cup has a frusto-pyramidal shape. In some embodiments, the cup can be shaped as shown below in FIGS. 12 through 14 such that the cup has a generally circular (horizontal) cross section when viewed through the opening of the cup (plan view) and in some embodiments has tapered sidewalls such that the cup has a generally frusto-conical shape.

Figure 12:
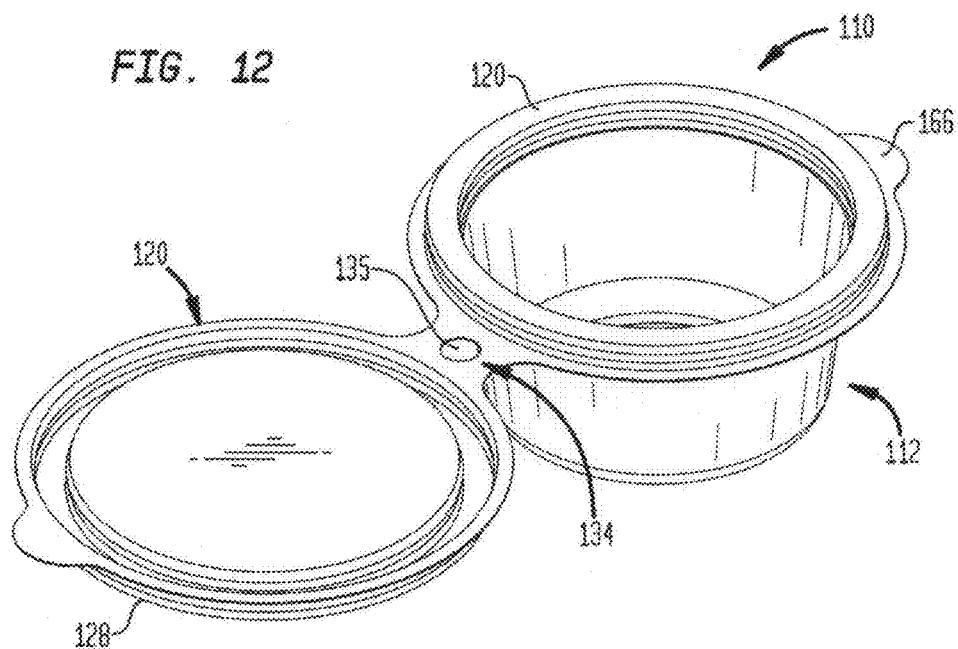
FIG. 12 is a top perspective view of yet another container of the present invention.
Figure 13:
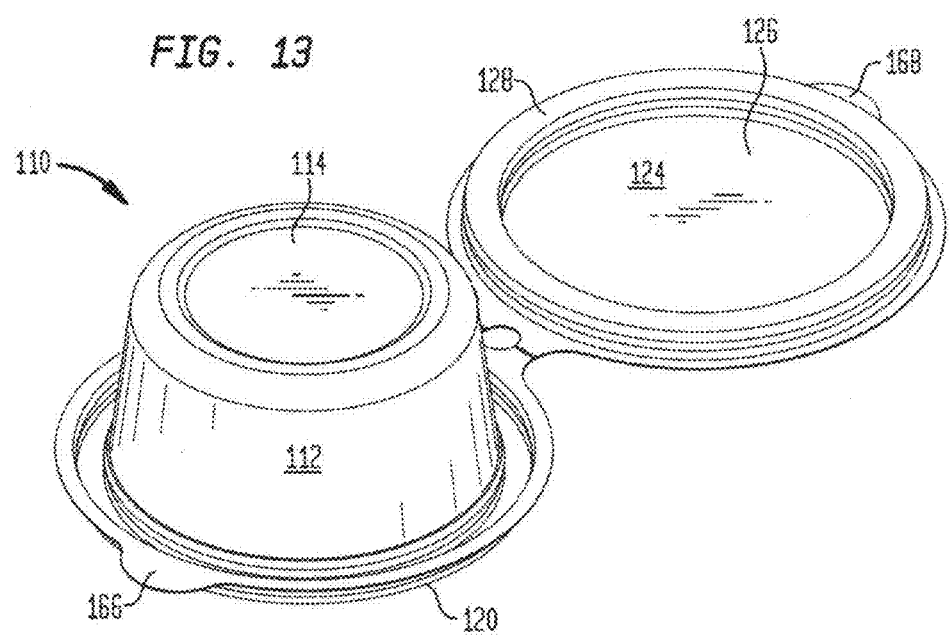
FIG. 13 is a bottom perspective view of the container of FIG. 12.
Figure 14:
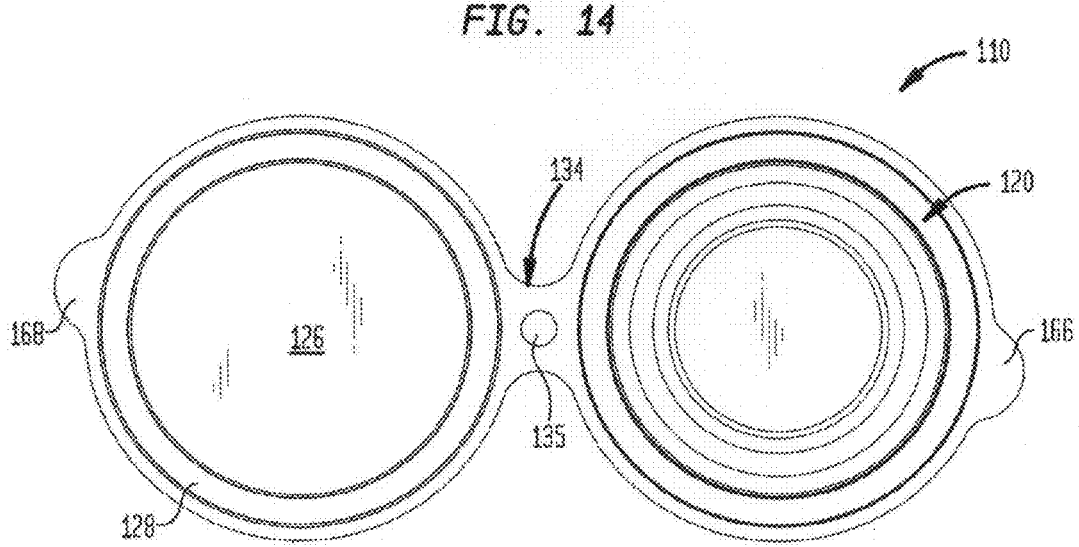
FIG. 14 is a top plan view of the container of FIGS. 12 and 13 in an open position.

Referring to FIGS. 12, 13 and 14, another embodiment showing a container 110 with a cup portion 112 attached by way of a hinge portion 132 to a lid 124. In some embodiments, cup 112 includes a bottom panel 114 as well as a sidewall 116 and a U-shaped sealing brim at 120. In some embodiments, lid 124 includes a generally planar top panel 126 with a sealing rim 128.

In some embodiments, hinge portion included a circular cutaway to increase flexibility and likewise has an arched profile as discussed in connection with container 10. In some embodiments, the circular cutaway has a diameter of at least 0.05 inches, at least 0.1 inches, at least 0.25 inches, at least 0.5 inches, at least 0.75 inches, or at least 1 inch. In some embodiments, the portions of hinge that are kept intact are 0.05 inches to 1 inch long (direction parallel to the axis of rotation), 0.1 to 0.5 inches long, or 0.1 to 0.25 inches long. In some embodiments it is believed that keeping the two outside portions of the hinge, closing alignment is maintained between cup portion and lid as the container is closed/reopened/reclosed. In some embodiments, lid 124 includes an opening tab 168, while cup 112 includes a corresponding tab 166.

Product Testing

Products of the invention and various available thermoformed products were tested for Capping Force, Lid Open Force, Container Crush Force, and Corner Crush Force using a universal Instron® tensile/compression tester. All of the values reported in this application are tested according to the following specifications.

Capping Force Method 1

Figure 15:
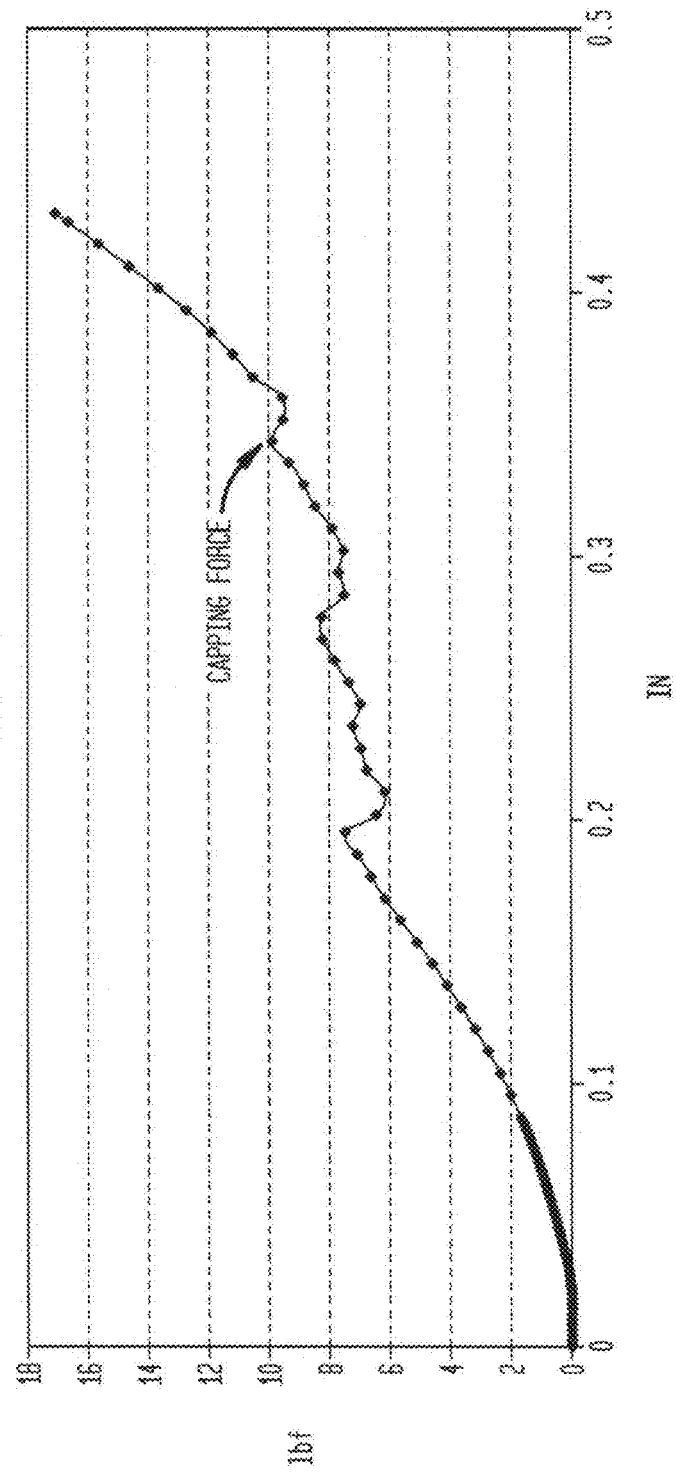
FIG. 15 is a plot of force versus probe displacement illustrating measurement of the capping force required for a 2 ounce, 20 gauge container of the invention.

All capping or closing forces that are reported in this specification are measured by the following method. Testing was performed using an Instron 4502 with Merlin software. Acrylic stands were made for each size of container so it was supported by its upper rim. ¼ inch diameter stainless steel ball bearings were added to the container to obtain a weight in ounces that was ⅔ of its capacity in ounces (i.e. 16 ounces of ball bearings were added to a container that has a volume of 24 ounces). Should it not be possible to reach the exact weight given that it is impossible to add a portion of a ball bearing, the number of ball bearings that gives you a weight closest to that required will be added. The cover was set on top of the container and the container, cover and stand was placed into and centered on the tensile tester platform below the compression probe (FIG. 1).). The probe has a round contact surface with a surface area of 1.0 in². The probe was brought down onto the lid and a preload less than 0.1 lbf was applied. The test is initiated and the probe compressed the lid at a 10 in/min. speed for a 0.5 inch or until the crush force of the container is reached. The capping force is defined as the final plateau or dip in the load/elongation curve. The plateau is caused by the lid corners clicking into place on the container. The highest load in pounds of force on the plateau or dip is taken as the lid close force. There is provided in FIG. 15 a typical capping force plot for a container of the invention.

Leak Capping Force Method 1

Figure 16:
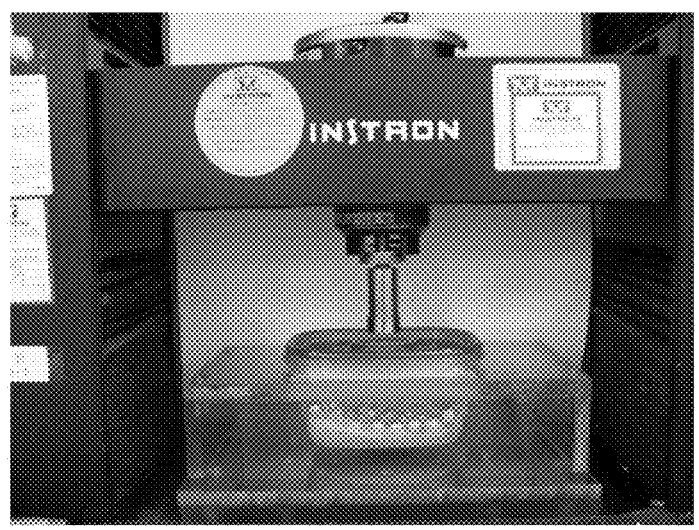
FIG. 16 is a photograph of a container centered on a tensile tester platform below a compression probe for leak capping force testing.

All leak capping forces that are reported in this specification are measured by the following method. Testing was performed using an Instron 4502 with Merlin software. Acrylic stands were made for each size of container so it was supported by its upper rim. The container is filled ⅔ full with tap water. The cover was set on top of the container and the container, cover and stand was placed into and centered on the tensile tester platform below the compression probe (FIG. 16). The probe has a round contact surface with a surface area of 1.0 in². The probe was brought down onto the lid and a preload less than 0.1 lbf was applied. The test is initiated and the probe compressed the lid at a 10 in/min. speed for a 0.5 inch or until the crush force of the container is reached. The container was removed from the tester after every 0.005 inches that probe compressed the lid and the container is tested for leaks using Leak Test Method 1. The leak capping force is defined as the force measured by the Instron at the minimum extension of the Instron where the container does not leak as defined by Leak Test Method 1. To shorten the procedure, one skilled in the art can use the capping force plot for a container to pick a starting point to begin the measurements. The only criterion for the starting point that is picked is that the container leaks at the initial Instron extension. It is understood that some containers will always leak and those containers that do not produce a leak-proof seal will not have a leak capping force and will be outside the scope of any embodiments that require a measured leak capping force.

Lid Open Force Method 1

Figure 17:
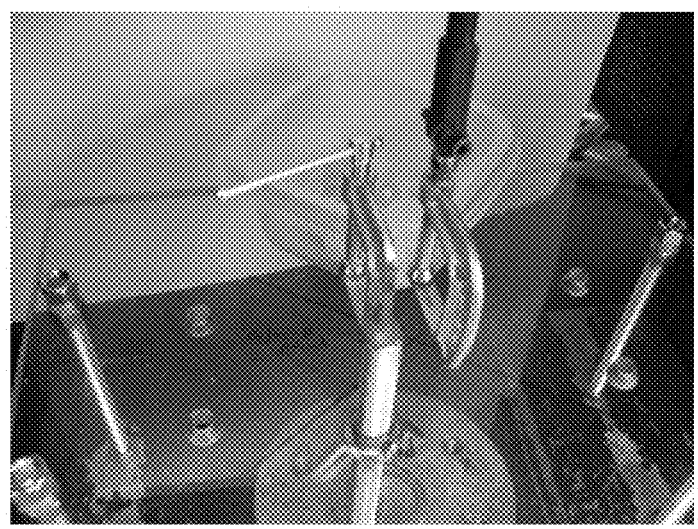
FIG. 17 is a photograph of a container secured by clamps for lid open force testing.
Figure 18:
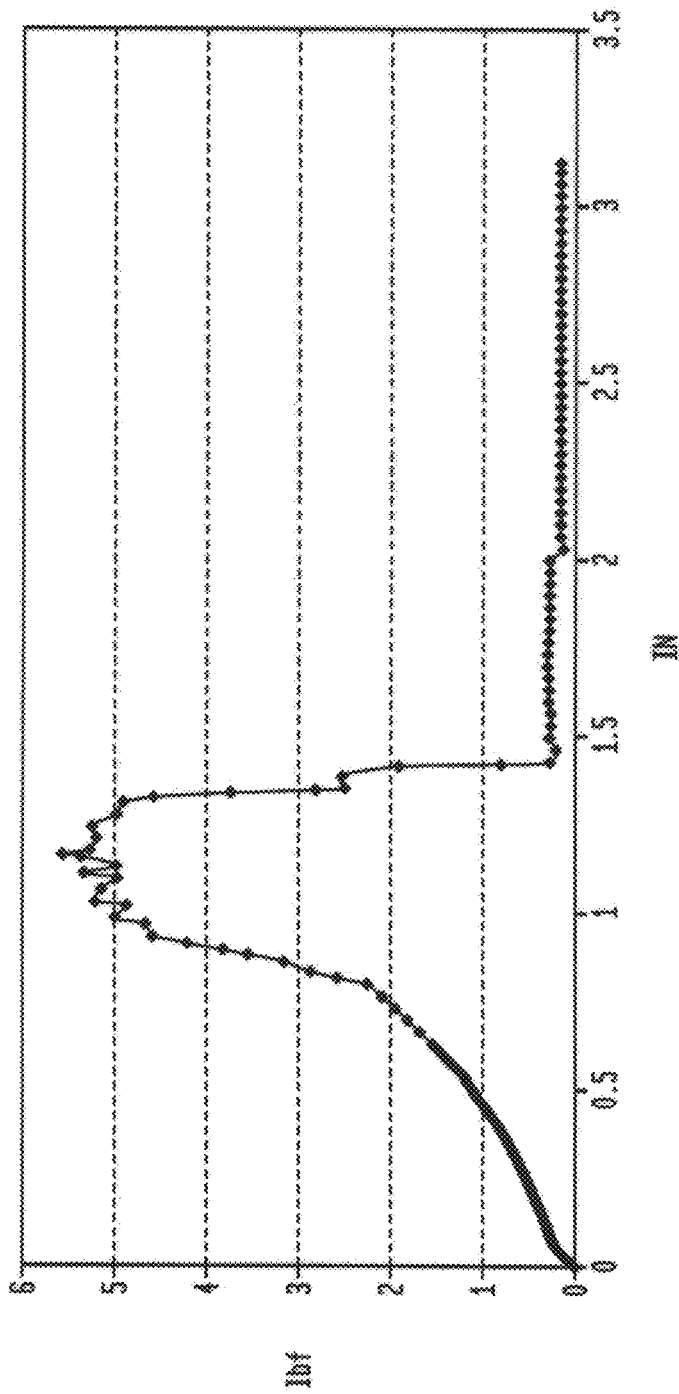
FIG. 18 is a plot of pounds force versus probe displacement illustrating measurement of the Lid Open Force of a 20 ounce, 20 gauge container of the present invention.

Testing was performed using an Instron 4502 with Merlin software. An Acrylic stands with two 1", "C"-clamps was fabricated to hold the two tabs of the container. One clamp was stationary and held to the base and the other was connected to the moving upper platen and the load cell. The tab that was closest to the center of the container was secured by the stationary clamp and the tab in the corner was secured by the clamp that was connected to the load cell (FIG. 17). If the container only had one tab it was secured by the clamp that was connected to the load cell and the base of the container was held by hand during the test. Metal balls were added to the container before the lid close force test to obtain a weight that was ⅔ of its capacity. Once the container was secured by both clamps the test was initiated and the cover was pulled off at a speed of 20 in/min. The lid open force is defined as the maximum load in lbf to remove the lid. FIG. 18 is a typical plot seen when measuring Lid Open Force.

Crush Force Test Method 1

Figure 19:
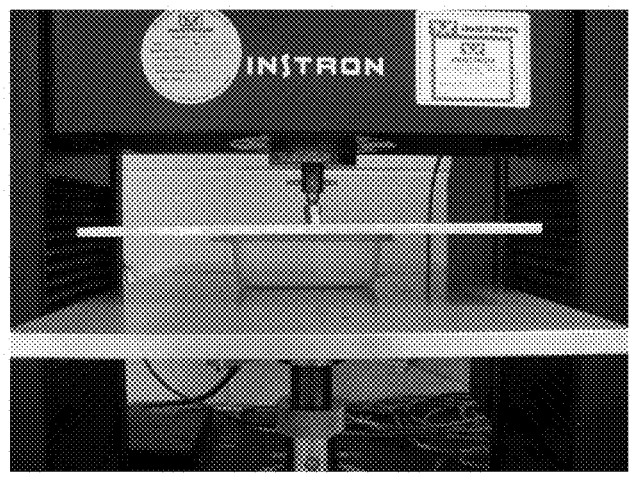
FIG. 19 is a photograph of a container between two parallel platens for crush force testing.
Figure 20:
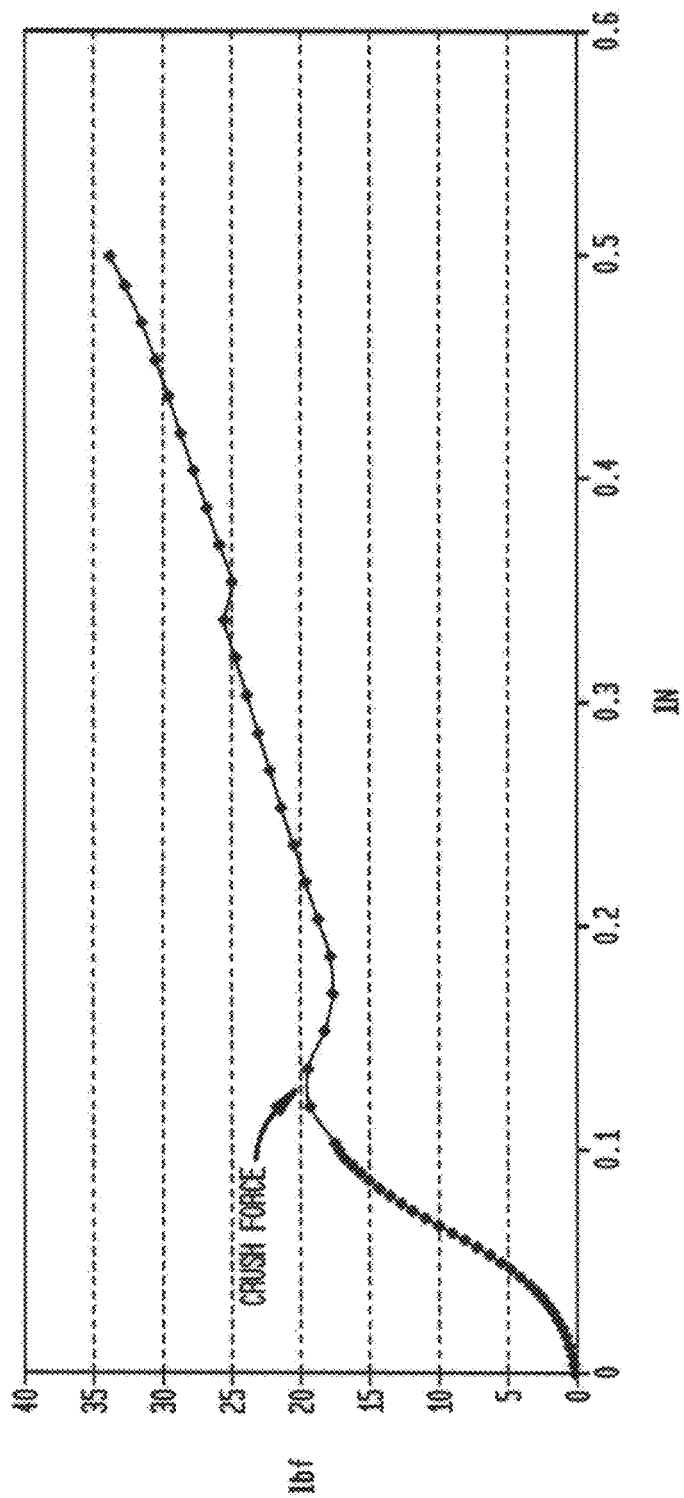
FIG. 20 is a plot of pounds force versus probe displacement illustrating measurement of the Crush Force of an 8 ounce, 20 gauge container of the present invention.

Testing was performed using an Instron 4502 with Merlin software. Two parallel platens were used. A large solid base and an upper movable upper platen that was larger than the container being crushed. The lid was placed on the container and closed. It was placed between the upper and base platen. The upper moveable platen was brought down to contact the container with a preload less than 0.1 lbf (FIG. 19). The test was initiated and the container was crushed at 10 in/min until the sidewall buckled. The crush force is defined as the load in pounds of force at which the sidewall buckles. A typical plot showing crush-force measurement appears in FIG. 20.

Corner Crush Force Method 1

Figure 21:
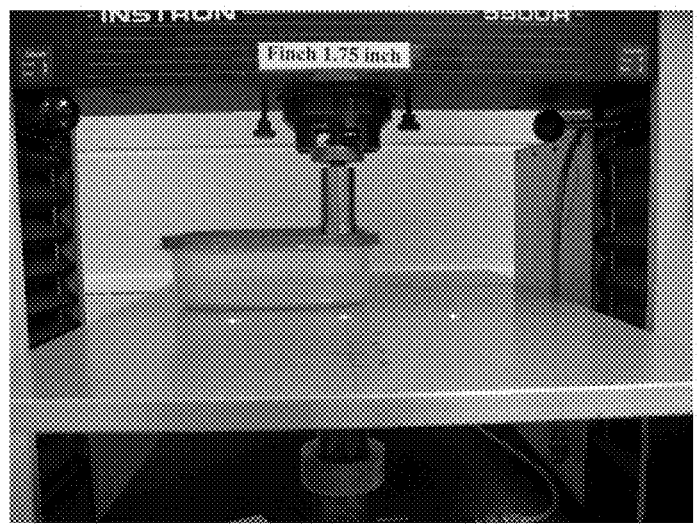
FIG. 21 is a photograph of a container between a solid base and a probe for corner crush force testing.
Figure 22:
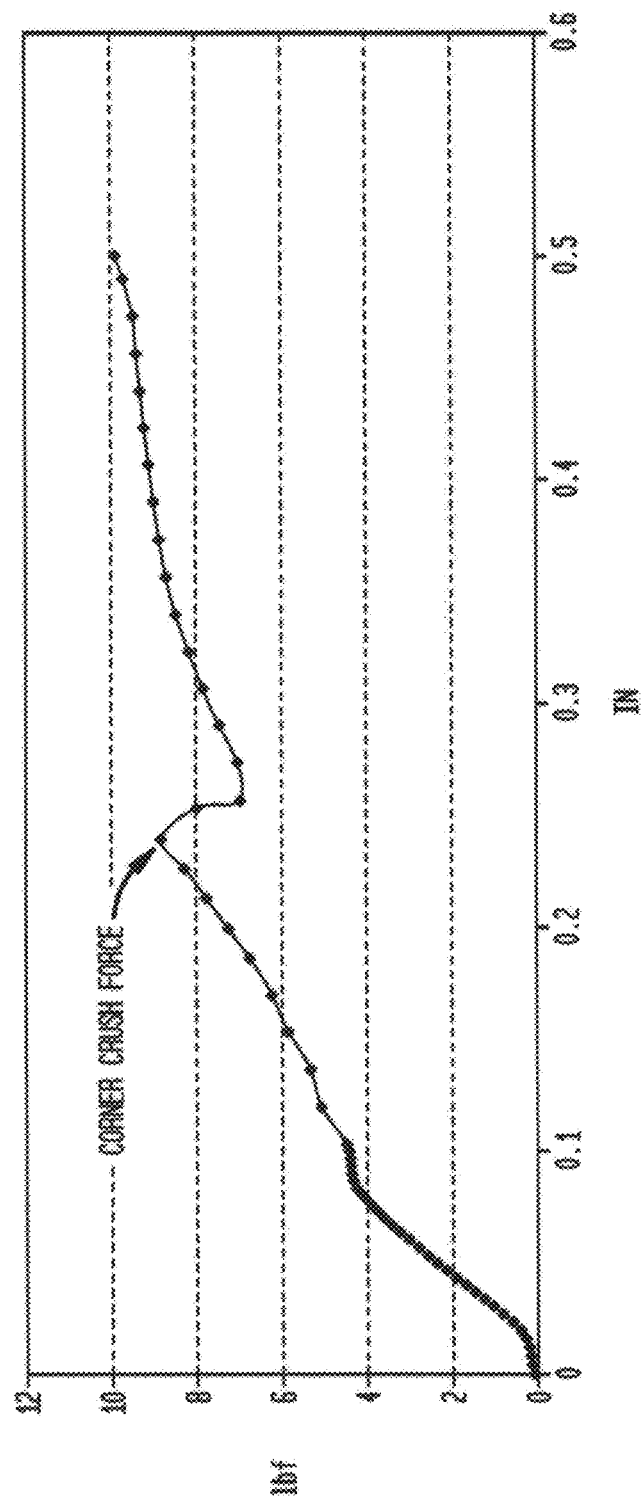
FIG. 22 is a plot of pounds force versus probe displacement illustrating measurement of the Corner Crush Force of an 8 ounce, 22.5 gauge container.

Testing was performed using an Instron 4502 with Merlin software. A large solid base and an upper movable probe were used for the corner crush test. The probe is a 1 in² with a diameter of 1.082 inches. The lid was placed on the container and closed. It was placed on the solid base positioning the corner opposite the tab under the probe. The upper moveable probe was brought down to contact the container with a preload less than 0.1 lbf (FIG. 21). The test was initiated and the container was crushed at 10 in/min until the sidewall buckled. The corner crush force is defined as the load in lbf at which the sidewall buckles. A typical plot showing Corner Crush Force appears in FIG. 22.

Leak Test Method 1

Leak testing was performed by filling the container ⅔ full with tap water, lidding the container and placing the container on its side on blotter paper. After 10 minutes, the amount of water collected on the blotter was measured by weighing the blotter paper before and after the test. A container is considered to have leaked if more than 0.1 mL of water is collected on the blotter paper.

Container Thickness Test Method 1

Container thickness can be measured by a Magna-Mike 8500. In applications such as plastic containers, the operator simply drops the small target ball inside the container. The magnetic probe held on the outsider of the container attracts the target ball. When the operator scans the probe along the surface or critical corners, the small steel target ball will follow. Should an area not be accessible to either the small target ball or the probe, the portion of the container that the operator desires to measure may be cut out to allow access to that point.

All testing was performed under ambient conditions. Results appear in Tables 1-3 below.

TABLE 1

Container Properties

| ID | Container Capacity ounces | Lid Close lbs force | Lid lineal inch | Close Force per/ lineal in | Tip Container on Side Leak Y/N |
|---|---|---|---|---|---|
| Gladware | 24 | 0.9 | 19.0 | 0.05 | y |
| Gladware | 24 | 1.6 | 19.0 | 0.08 | y |
| Gladware | 24 | 1.9 | 19.0 | 0.10 | y |
| Gladware | 24 | 2.3 | 19.0 | 0.12 | y |
| Gladware | 24 | 2.3 | 19.0 | 0.12 | y |
| Gladware | 24 | 2.5 | 19.0 | 0.13 | y |
| Gladware | 24 | 2.7 | 19.0 | 0.14 | y |
| Gladware | 24 | 3.4 | 19.0 | 0.18 | y |
| Gladware | 24 | 3.5 | 19.0 | 0.18 | y |
| 6.d | 6 | 3.0 | 11.1 | 0.27 | y |
| Gladware | 24 | 5.8 | 19.0 | 0.31 | y |
| 6.c | 6 | 3.7 | 11.1 | 0.33 | y |
| Gladware | 24 | 7.1 | 19.0 | 0.37 | y |
| Ziploc | 20 | 7.7 | 19.5 | 0.39 | y |
| Ziploc | 20 | 8.6 | 19.5 | 0.44 | n |
| Ziploc | 20 | 8.8 | 19.5 | 0.45 | y |
| Gladware | 24 | 9.1 | 19.0 | 0.48 | n |
| 24.a | 24 | 9.1 | 18.5 | 0.49 | n |
| Ziploc | 20 | 9.7 | 19.5 | 0.50 | n |
| Ziploc | 20 | 9.9 | 19.5 | 0.51 | n |
| Ziploc | 20 | 10.0 | 19.5 | 0.51 | y |
| Gladware | 24 | 10.1 | 19.0 | 0.53 | n |
| Ziploc | 20 | 10.6 | 19.5 | 0.54 | n |
| 24.b | 24 | 10.1 | 18.5 | 0.55 | n |
| Ziploc | 20 | 10.7 | 19.5 | 0.55 | n |
| Ziploc | 20 | 10.8 | 19.5 | 0.55 | n |
| Ziploc | 20 | 10.8 | 19.5 | 0.55 | n |
| Ziploc | 20 | 11.1 | 19.5 | 0.57 | n |
| Ziploc | 20 | 11.2 | 19.5 | 0.57 | n |
| Ziploc | 20 | 11.4 | 19.5 | 0.58 | n |
| Gladware | 24 | 11.3 | 19.0 | 0.59 | n |
| 18.a | 18 | 11.1 | 18.5 | 0.60 | n |
| Ziploc | 20 | 11.8 | 19.5 | 0.61 | n |
| Gladware | 24 | 11.6 | 19.0 | 0.61 | n |
| Ziploc | 20 | 12.1 | 19.5 | 0.62 | n |
| 8.c | 8 | 8.0 | 12.4 | 0.65 | n |
| Ziploc | 20 | 12.6 | 19.5 | 0.65 | n |
| Target | 24 | 12.7 | 18.5 | 0.69 | n |
| 6.b | 6 | 7.7 | 11.1 | 0.69 | n |
| Liddles | 8 | 8.6 | 12.4 | 0.69 | n |
| Target | 24 | 13 | 18.5 | 0.70 | n |
| Target | 24 | 13 | 18.5 | 0.70 | n |
| Target | 24 | 13.4 | 18.5 | 0.72 | y |
| 8.a | 8 | 9.0 | 12.4 | 0.73 | n |
| 8.d | 8 | 9.0 | 12.4 | 0.73 | n |
| Gladware | 24 | 14.6 | 19.0 | 0.77 | n |
| Target | 24 | 14.4 | 18.5 | 0.78 | n |
| Target | 24 | 15.4 | 18.5 | 0.83 | n |
| Target | 24 | 15.9 | 18.5 | 0.86 | y |
| 8.e | 8 | 10.7 | 12.4 | 0.86 | n |
| 6.a | 6 | 9.7 | 11.1 | 0.87 | n |
| Target | 24 | 16.9 | 18.5 | 0.91 | n |
| Target | 24 | 18.5 | 18.5 | 1.00 | n |
| Target | 24 | 19.3 | 18.5 | 1.04 | n |
| Target | 24 | 19.5 | 18.5 | 1.05 | n |
| 2.a | 2 | 9.8 | 8.0 | 1.23 | n |

TABLE 2

| | | | | | | | | | | | | |
|---|---|---|---|---|---|---|---|---|---|---|---|---|
| Container Dimensions and Properties | | | | | | | | | | | | |
| ID | Container Capacity ounces | Thickness mils | Lid Rim Chamfer Angle | Seal Area Length mils | Side Wall Height inches | | Crush Force lbs | Lid Close lbs force | Crush to Close Ratio | Lid lineal inch | Close Force per/ lineal in | Tip Container on Side Leak Y/N | Lid Open lbs force |
| 2.a | 2 | 20 | 45 | 60 | 1 | | 41 | 9.8 | 4.2 | 8.0 | 1.23 | n | 6.4 |
| 4.a | 4 | 20 | 45 | 60 | 1.5 | | | | | 9.6 | 0.00 | | |
| 6.a | 6 | 20 | 45 | 60 | 1.5 | | 17 | 9.7 | 1.8 | 11.1 | 0.87 | n | 2.5 |
| 6.b | 6 | 22.5 | 45 | 60 | 1.5 | | 18 | 7.7 | 2.3 | 11.1 | 0.69 | n | 1.8 |
| 6.c | 6 | 25 | 45 | 60 | 1.5 | loose fit | 27 | 3.7 | 7.3 | 11.1 | 0.33 | y | 2 |
| 6.d | 6 | 28 | 45 | 60 | 1.5 | loose fit | 30 | 3.0 | 10.0 | 11.1 | 0.27 | y | 3.2 |
| 8.a | 8 | 20 | 45 | 60 | 1.75 | | 17 | 9.0 | 1.9 | 12.4 | 0.73 | n | 2.5 |
| 8.b | 8 | 20 | 45 | 40 | 1.75 | | 38 | 8.6 | 4.4 | 12.4 | 0.69 | n | 2.9 |
| 8.c | 8 | 20 | 45 | 30 | 1.75 | | 31 | 8.0 | 3.9 | 12.4 | 0.65 | n | 2.4 |
| 8.d | 8 | 20 | 45 | 60 | 1.75 | | 17 | 9.0 | 1.9 | 12.4 | 0.73 | n | 3.8 |
| 8.e | 8 | 22.5 | 45 | 60 | 1.75 | | 19 | 10.7 | 1.8 | 12.4 | 0.86 | n | 4.4 |
| 18.a | 18 | 20 | 45 | 60 | 1.5 | | 37 | 11.1 | 3.3 | 18.5 | 0.60 | n | 2.8 |
| 24.a | 24 | 20 | 45 | 60 | | | 24 | 9.1 | 2.6 | 18.5 | 0.49 | n | 3.9 |
| 24.b | 24 | 22.5 | 45 | 60 | | | 20 | 10.1 | 2.0 | 18.5 | 0.55 | n | 4.2 |
| Gladware | 24 | | | | | | 105 | 7.1 | 14.8 | 19.0 | 0.37 | y | 2.4 |
| Gladware | 24 | | | | | | | 1.6 | | 19.0 | 0.08 | y | |
| Gladware | 24 | | | | | | | 2.3 | | 19.0 | 0.12 | y | |
| Gladware | 24 | | | | | | | 5.8 | | 19.0 | 0.31 | y | |
| Gladware | 24 | | | | | | | 1.9 | | 19.0 | 0.10 | y | |
| Gladware | 24 | | | | | | | 0.9 | | 19.0 | 0.05 | y | |
| Gladware | 24 | | | | | | | 2.3 | | 19.0 | 0.12 | y | |
| Gladware | 24 | | | | | | | 2.5 | | 19.0 | 0.13 | y | |
| Gladware | 24 | | | | | | | 2.7 | | 19.0 | 0.14 | y | |
| Gladware | 24 | | | | | | | 3.4 | | 19.0 | 0.18 | y | |
| Gladware | 24 | | | | | | | 3.5 | | 19.0 | 0.18 | y | |
| Gladware | 24 | | | | | | | 11.3 | | 19.0 | 0.59 | n | |
| Gladware | 24 | | | | | | | 11.6 | | 19.0 | 0.61 | n | |
| Gladware | 24 | | | | | | | 9.1 | | 19.0 | 0.48 | n | |
| Gladware | 24 | | | | | | | 10.1 | | 19.0 | 0.53 | n | |
| Gladware | 24 | | | | | | | 14.6 | | 19.0 | 0.77 | n | |
| Ziploc | 20 | | | | | | 74 | 7.7 | 9.6 | 19.5 | 0.39 | y | 5 |
| Ziploc | 20 | | | | | | | 8.8 | | 19.5 | 0.45 | y | |
| Ziploc | 20 | | | | | | | 10.0 | | 19.5 | 0.51 | y | |
| Ziploc | 20 | | | | | | | 8.6 | | 19.5 | 0.44 | n | |
| Ziploc | 20 | | | | | | | 10.8 | | 19.5 | 0.55 | n | |
| Ziploc | 20 | | | | | | | 9.9 | | 19.5 | 0.51 | n | |
| Ziploc | 20 | | | | | | | 11.2 | | 19.5 | 0.57 | n | |
| Ziploc | 20 | | | | | | | 12.6 | | 19.5 | 0.65 | n | |
| Ziploc | 20 | | | | | | | 9.7 | | 19.5 | 0.50 | n | |
| Ziploc | 20 | | | | | | | 10.7 | | 19.5 | 0.55 | n | |
| Ziploc | 20 | | | | | | | 11.1 | | 19.5 | 0.57 | n | |
| Ziploc | 20 | | | | | | | 10.8 | | 19.5 | 0.55 | n | |
| Ziploc | 20 | | | | | | | 11.8 | | 19.5 | 0.61 | n | |
| Ziploc | 20 | | | | | | | 10.6 | | 19.5 | 0.54 | n | |
| Ziploc | 20 | | | | | | | 11.4 | | 19.5 | 0.58 | n | |
| Ziploc | 20 | | | | | | | 12.1 | | 19.5 | 0.62 | n | |
| Target | 24 | | | | | | 82 | 12.7 | 6.5 | 18.5 | 0.69 | n | 4.8 |
| Target | 24 | | | | | | | 18.5 | | 18.5 | 1.00 | n | |
| Target | 24 | | | | | | | 13 | | 18.5 | 0.70 | n | |
| Target | 24 | | | | | | | 16.9 | | 18.5 | 0.91 | n | |
| Target | 24 | | | | | | | 14.4 | | 18.5 | 0.78 | n | |
| Target | 24 | | | | | | | 19.3 | | 18.5 | 1.04 | n | |
| Target | 24 | | | | | | | 19.5 | | 18.5 | 1.05 | n | |
| Target | 24 | | | | | | | 13 | | 18.5 | 0.70 | n | |
| Target | 24 | | | | | | | 15.4 | | 18.5 | 0.83 | n | |
| Target | 24 | | | | | | | 13.4 | | 18.5 | 0.72 | y | |
| Target | 24 | | | | | | | 15.9 | | 18.5 | 0.86 | y | |

TABLE 3

Selected Force Values For Containers
Lid Close Force, Lid Open Force, Crush Force and Corner Crush Force Testing
24, Apr. 2009

| Sample Number | Sample ID | Repeat | Lid Close Force (lbf) | Lid Open Force (lbf) | Crush Force (lbf) | Corner Crush w/ probe (lbf) |
|---|---|---|---|---|---|---|
| 1-1 | Gladware, 24 oz | Average: | 7.062 | 2.444 | 105.4 | 38.5 |
| 2-1 | Ziploc, 20 oz | Average: | 7.743 | 5.016 | 74.4 | 16.2 |
| 3-1 | Target, 24 oz | Average: | 16.648 | 4.770 | 81.615 | |
| 4-1 | Target, 25 oz | Average: | 9.370 | 4.075 | 91.4 | |
| 5-1 | 2 oz, 20 mil | Average: | 9.822 | 6.362 | 40.6 | 22.2 |
| 6-1 | 8 oz, 22.5 mil | Average: | 10.700 | 4.418 | 18.8 | 8.45 |
| 7-1 | 8 oz, 20 mil | Average: | 9.040 | 3.794 | 16.7 | 3.26 |
| 8-1 | 18 oz, 20 mil | Average: | 11.214 | 2.845 | 36.6 | 12.1 |
| 9-1 | 6 oz, 28 mil | Average: | 12.161 | 3.225 | 27.7 | 11.7 |
| 10-1 | 6 oz, 25 mil | Average: | 5.170 | 1.955 | 26.8 | 16.4 |
| 11-1 | 6 oz, 20 mil | Average: | 9.699 | 2.536 | 20.0 | 10.7 |
| 12-1 | 6 oz, 22.5 mil | Average: | 7.683 | 1.826 | 18.2 | 7.9 |

NOTE:
Data repeats can be compared because testing was done the same container. Test order was Lid close, Lid Open and then Crush. The Corner Crush tests were performend on separate containers.

Countertop Stability and Living Hinge Characteristics

In some embodiments, the geometry of the container and the hinge characteristics are selected to promote countertop stability of the container, particularly, in some embodiments, hinge is not capable of sustaining a force sufficient to upset an empty and/or a nearly empty container and cause spills.

In some embodiments, the height of the cup is no greater than its width. In some embodiments, the weight of the lid will be within 25%, 15%, 10%, 5%, or 1% of the weight of the cup. In some embodiments, the lid and cup are thermoformed from about the same area of polymer as the other. Similarly, in some embodiments, the base of the cup will be narrower than its mouth.

If the moment required to hold the lid in a downwardly deflected position increases monotonically (not necessarily linearly, just increasing as the angle increases) with its deflection from neutral, the maximum moment exerted on the hinge by the lid will be when the lid is about to touch the table the cup is resting on. At that point, the weight of the lid exerts a moment equal to the mass of the lid times its effective moment arm which is:

$$m_l r_l \cos \theta$$

where $m_l$ is the mass of the lid portion $r_l$ is the radius to the center of mass of the lid from the hinge line and $\theta$ is the angle by which the lid droops from horizontal.

But $\cos \theta$ when the lid is about to touch the table is equal to $$\frac{\sqrt{w_l^2 - h_c^2}}{w_l}$$

where $w_l$ is the length of the lid, $r_l$ is $w_l/2$; and $h_c$ is the height of the hinge above the table.

Thus unless the hinge is able to exert a moment exceeding $$m_l r_l \cos\theta = m_l \left(\frac{w_l}{2}\right)\cos\theta = \frac{m_l(w_l)}{2} \frac{\sqrt{w_l^2 - h_c^2}}{w_l} = \frac{m_l \sqrt{w_l^2 - h_c^2}}{2}$$

The lid will rest upon the table.

Similarly for the cup to rise off of the table the hinge must be capable of sustaining a moment of greater than $$m_c r_c$$

where $m_c$ is the mass of the cup portion and rc is the horizontal distance to the center of mass of the cup portion from the hinge.

So unless the hinge is capable of sustaining a moment which more than the greater of:

$$m_c r_c \text{ and } \frac{m_l \sqrt{w_l^2 - h_c^2}}{2}$$

the lid will flop to the table without tilting the cup.

Accordingly, in some embodiments, the maximum moment the hinge is capable of sustaining is either:
less than $m_c r_c$ or
less than $$\frac{m_l \sqrt{w_l^2 - h_c^2}}{2}$$

In some embodiments, the lid will flop toward the table or countertop without tilting the cup.

In some embodiments, an elastic hinge is designed so the hinge will not break, that is, not exceed the yield strength of the material in normal use. In some embodiments, the required hinge length L for a material of thickness t may be calculated as:

$$L = \frac{t\pi E_{secant,yield}}{\sigma_{yield}}$$

where $E_{secant,yield}$ is the secant modulus at yield and $\sigma_{yield}$ is stress at yield. On the other hand, for a plastic hinge the ultimate modulus and stress at break are used:

$$L = \frac{t\pi E_{secant,ultimate\ strength}}{\sigma_{ultimate}}$$

where $E_{secant,ultimate\ strength}$ is the secant modulus at break and $\sigma_{ultimate}$ the stress at break. Plastic hinges are typically relatively stiff and last for only a limited number of open/close operations.

It has been unexpectedly found in accordance with the present invention that the coined hinge of some embodiments of the present invention behaves substantially as an elastic hinge as opposed to plastic hinge behavior as is typical in thermoformed products. In some embodiments of the present invention, the container has a coined hinge. In some embodiments of the present invention, a hinge is concurrently thermoformed with the rest of the container over an arched rule to provide an arched profile to the hinge as is seen in the various Figures. In some embodiments, while the hinge is still warm, in some embodiments immediately after the part is thermoformed, the arched hinge is struck with a suitably shaped anvil under pressure to thin the material in the hinge and provide a living hinge type of profile wherein there is provided a thinned region extending over the length of the hinge on the compression side of the hinge and an opposite large radius on the extending part of the hinge. Without being bound by any theory, it is believed the coining step at least partially orients the polymer in a direction transverse to the hinge axis of rotation to provide the remarkable elasticity observed in the product.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A container comprising:
   a cup portion having a maximum gauge of less than 35 mils, the cup portion comprising a bottom panel, a sidewall, and a sealing brim defining an annular cup sealing surface;
   a lid having a maximum gauge of less than 35 mils, the lid comprising a sealing rim defining an annular lid sealing surface; and
   a hinge portion integrally formed with and connecting the cup portion and the lid, the hinge portion comprising a coined region extending longitudinally along an axis of rotation of the hinge portion and a cut-away portion disposed along the axis of rotation of the hinge portion;
   wherein the cup portion, the lid, and the hinge portion are thermoformed from proximate areas of a thermoplastic sheet stock, and wherein the annular cup sealing surface and the annular lid sealing surface are configured to cooperate to form a seal therebetween extending around the container upon assembly.

2. The container according to claim 1, wherein the hinge portion has an arched profile disposed on a compression side of the hinge portion.

3. The container according to claim 1, wherein the cup portion and the lid are formed from a microwaveable material.

4. The container according to claim 1, wherein the cup portion and the lid are formed from nucleated polypropylene.

5. The container according to claim 1, wherein the seal is a surface-to-surface interference-fit seal extending around the assembled container.

6. The container according to claim 1, wherein a capping force of the container as measured by a Capping Force Test Method is at least 0.4 lbs/lineal inch.

7. The container according to claim 1, wherein a capping force of the container as measured by a Capping Force Test Method is less than 1.0 lbs/lineal inch.

8. The container according to claim 1, wherein the container does not leak when tested using a Leak Test Method 1.

9. The container according to claim 1, wherein the cup portion has a generally circular cross-section and a frusto-conical shape.

10. The container according to claim 1, wherein the cup portion has a rectangular cross-section and a frusto-pyramidal shape.

11. The container according to claim 10, wherein the cup portion comprises chamfered corners having a thickness greater than adjacent areas of the cup portion.

12. The container according to claim 11, wherein the corners are chamfered at an external angle of from 30° to 60°.

13. The container according to claim 1, wherein the cup portion has an interior volume of from 2 oz. to 30 oz.

14. The container according to claim 1, wherein the container exhibits a Capping Force of up to 4 lbs./lineal inch of seal perimeter.

15. The container according to claim 1, wherein the container exhibits a Crush Force/Capping Force ratio of from 4 to 1.75.

16. A method of making a container comprising the steps of:
   providing a thermoforming mold comprising a first cavity for forming a cup portion of the container and a second cavity for forming a mating lid of the container, the second cavity disposed in proximity to the first cavity, the first cavity shaped to form the cup portion comprising a bottom panel, a sidewall, and a sealing brim defining an annular cup sealing surface, the second cavity shaped to form the lid comprising a sealing rim defining an annular lid sealing surface;
   feeding thermoplastic sheet stock having a maximum gauge of less than 35 mils to the mold;
   concurrently thermoforming the cup portion and the lid in the mold in proximity to one another from proximate areas of the thermoplastic sheet stock such that the cup portion is connected to the lid by a hinge portion, wherein the thermoforming is controlled, the sheet stock is selected, and the first cavity and the second cavity are shaped such that upon assembly of the container the annular cup sealing surface and the annular lid sealing surface cooperate to form a seal extending around the container;
   coining the hinge portion such that the hinge portion comprises a coined region extending longitudinally along an axis of rotation of the hinge portion; and removing material from the hinge portion such that the hinge portion comprises a cut-away portion disposed along the axis of rotation of the hinge portion.

17. The method of making a container according to claim 16, wherein the seal is a surface-to-surface interference-fit seal extending around the assembled container.

18. A thermoformed sealable container comprising:
a cup portion comprising a sidewall, a bottom, and a sealing brim defining an interior volume, the sealing brim having a U-shaped profile;
a lid comprising a sealing rim having a U-shaped profile; and
a hinge portion integrally formed with and connecting the cup portion and the lid, the hinge portion comprising a coined region extending longitudinally along an axis of rotation of the hinge portion and a cut-away portion disposed along the axis of rotation of the hinge portion;
wherein the cup portion, the lid, and the hinge portion are thermoformed from proximate areas of a thermoplastic sheet stock, and wherein the sealing brim of the cup portion and the sealing rim of the lid are configured to cooperate to form a seal therebetween along an interior wall of the sealing brim of the cup portion and to define a clearance therebetween along an exterior wall of the sealing brim of the cup portion upon assembly to the container.

19. The thermoformed sealable container according to claim 18, wherein the seal is an interference-fit seal, and wherein the sealing brim of the cup portion and the sealing rim of the lid are otherwise non-interfering upon assembly of the container.

20. The thermoformed sealable container according to claim 19, wherein the interference-fit seal has from about 15 mils to about 50 mils of interference.

21. The thermoformed sealable container according to claim 19, wherein the interference-fit seal extends over an interference band width of from about 10 mils to 75 mils.

22. The thermoformed sealable container according to claim 18, wherein the U-shaped profile of the sealing rim comprises at least one chamfered lip.

23. The thermoformed sealable container according to claim 22, wherein the chamfered lip has a chamfer angle of from 30° to 60°.

24. The thermoformed sealable container according to claim 22, wherein the chamfered lip has a chamfer length of from 5 mils to 25 mils.

25. The thermoformed sealable container according to claim 18, wherein the U-shaped profile of the sealing rim comprises two chamfered lips.

26. A thermoformed sealable container comprising:
a cup portion comprising a sidewall, a bottom, and a sealing brim defining an interior volume;
a lid comprising a sealing rim; and
a hinge portion integrally formed with and connecting the cup portion and the lid, wherein the hinge portion has an arched hinge profile so that the hinge portion is substantially elastic and relatively pliant, and wherein the hinge portion is incapable of sustaining a hinge torque sufficient to tilt the cup portion when the cup portion is empty and disposed on a countertop.

27. The thermoformed sealable container according to claim 26, wherein the lid is configured to substantially freely rotate about the hinge portion.

28. The thermoformed sealable container according to claim 26, wherein the hinge portion comprises a cut-away portion.

29. The thermoformed sealable container according to claim 26, wherein the cup portion and the lid have a maximum gauge of less than 30 mils.

30. A thermoformed sealable container comprising:
a cup portion comprising a sidewall, a bottom, and a sealing brim defining an interior volume;
a lid comprising a sealing rim; and
a hinge portion integrally formed with and connecting the cup portion and the lid, wherein the hinge portion has an arched hinge profile, and wherein a maximum moment the hinge portion is capable of sustaining is: less than $m_c r_c$, or
less than $$\frac{m_l \sqrt{w_l^2 - h_c^2}}{2}$$

where $m_c$ is a mass of the cup portion, $r_c$ is a horizontal distance to a center of mass of the cup portion from the hinge portion, $m_l$ is a mass of the lid, $w_l$ is a length of the lid perpendicular to an axis of rotation of the hinge portion, and $h_c$ is a height of the hinge portion above a countertop upon which the cup portion rests.

31. The thermoformed sealable container according to claim 30, wherein the lid is configured to substantially freely rotate about the hinge portion.

32. The thermoformed sealable container according to claim 30, wherein the hinge portion comprises a coined region extending longitudinally along an axis of rotation of the hinged portion.

33. The thermoformed sealable container according to claim 30, wherein the hinge portion comprises a cut-away portion.

34. The thermoformed sealable container according to claim 30, wherein the cup portion and the lid have a maximum gauge of less than 30 mils.

35. A method of making a sealable container by thermoforming comprising:
providing a thermoforming mold comprising a first cavity for forming a cup portion of the container and a second cavity for forming a mating lid of the container, the second cavity disposed in proximity to the first cavity, the first cavity shaped to form the cup portion comprising a sidewall, a bottom, and a sealing brim defining an interior volume, the second cavity shaped to form the lid comprising a sealing rim;
feeding thermoplastic sheet stock having a maximum gauge of less than 35 mils to the mold;
concurrently thermoforming the cup portion and the lid in the mold in proximity to one another from proximate areas of the thermoplastic sheet stock such that the lid is connected to the cup portion by a hinge portion; and
coining the hinged portion to provide an arched profile thereto so that the hinge portion is substantially elastic and relatively pliant, wherein the hinge portion is incapable of sustaining a hinge torque sufficient to tilt the cup portion when the cup portion is empty and disposed on a countertop.

36. The method of making a sealable container according to claim 35, wherein the step of coining the hinged portion is effective to at least partially orient a polymer of the hinge portion in a direction generally transverse to an axis of rotation of the hinge portion.

37. A lightweight, thermoformed sealable container comprising:

a frusto-pyramidal cup portion having a maximum gauge of less than 35 mils, the cup portion comprising four sidewall panels, a bottom panel, four chamfered lower corner panels bridging the sidewall panels and the bottom panel, and a sealing brim defining an annular cup sealing surface;

a lid having a maximum gauge of less than 35 mils, the lid comprising a sealing rim defining an annular lid sealing surface; and a hinge portion integrally formed with and connecting the cup portion and the lid, the hinge portion comprising a coined region extending longitudinally along an axis of rotation of the hinge portion and a cut-away portion disposed along the axis of rotation of the hinge portion;

wherein the cup portion, the lid, and the hinge portion are thermoformed from proximate areas of a thermoplastic sheet stock, and wherein the annular cup sealing surface and the annular lid sealing surface are configured to cooperate to form a seal therebetween extending around the container upon assembly.

38. A packaged ensemble comprising:

at least five sealable containers, each of the sealable containers comprising:

a cup portion having a maximum gauge of less than 35 mils, the cup portion comprising a bottom panel, a sidewall, and a sealing brim defining an annular cup sealing surface;

a mating lid having a maximum gauge of less than 35 mils, the lid comprising a sealing rim defining an annular lid sealing surface; and a hinge portion integrally formed with and connecting the cup portion and the lid, the hinge portion comprising a coined region extending longitudinally along an axis of rotation of the hinge portion and a cut-away portion disposed along the axis of rotation of the hinge portion;

wherein the cup portion, the lid, and the hinge portion are thermoformed from proximate areas of a thermoplastic sheet stock, and wherein the annular cup sealing surfaces and the annular lid sealing surfaces are configured to cooperate to form seals therebetween extending around the containers upon assembly.

39. A lightweight, thermoformed sealable container comprising:

a cup portion having a maximum gauge of less than 35 mils, the cup portion comprising a bottom panel, a sidewall, and a sealing brim defining an annular cup sealing surface; and a lid having a maximum gauge of less than 35 mils, the lid comprising a sealing rim defining an annular lid sealing surface;

wherein the cup portion and the lid are thermoformed from proximate areas of a thermoplastic sheet stock, wherein the annular cup sealing surface and the annular lid sealing surface are configured to cooperate to form a seal therebetween extending around the container upon assembly, and wherein the container exhibits a Crush Force/Capping Force ratio of from 5 to 1.5, and a Capping Force of at least 0.4 lbs/lineal inch of seal perimeter.

\* \* \* \* \*